US012669365B1

(12) United States Patent
    Carballeira et al.

(10) Patent No.: US 12,669,365 B1
(45) Date of Patent: Jun. 30, 2026

(54) ELECTRONIC WEIGHT SENSOR ASSEMBLY

(71) Applicant: Smart Luggage One, Inc., Miami, FL (US)

(72) Inventors: Alberto Carballeira, Miami, FL (US); Robert Brady, Sarasota, FL (US); Anthony James Kelbert, Venice, FL (US); Matthew William Vergin, St. Petersburg, FL (US); Emanuel Guzman, Sarasota, FL (US)

(73) Assignee: SMART LUGGAGE ONCE, INC., Miami, FL (US)

( * ) Notice: Subject to any disclaimer, the term of this patent is extended or adjusted under 35 U.S.C. 154(b) by 407 days.

(21) Appl. No.: 18/340,931

(22) Filed: Jun. 26, 2023

Related U.S. Application Data

(63) Continuation-in-part of application No. 17/181,360, filed on Feb. 22, 2021, now abandoned.

(Continued)

(51) Int. Cl.
    *G01G 19/02* (2006.01)
    *G01G 5/00* (2006.01)
    (Continued)

(52) U.S. Cl.
    CPC ........... *G01G 19/027* (2013.01); *G01G 5/003* (2013.01); *G01G 21/22* (2013.01); *G01G 21/283* (2013.01)

(58) Field of Classification Search
    CPC ...... G01G 5/003; G01G 19/027; G01G 21/22; G01G 21/283
    See application file for complete search history.

(56) References Cited

U.S. PATENT DOCUMENTS 4,363,368 A * 12/1982 Paddon ................ G01G 19/445
                                                   177/144
4,711,313 A * 12/1987 Iida ........................ G01G 21/28
                                                   177/127

(Continued)

FOREIGN PATENT DOCUMENTS

CN         108709619      10/2018

OTHER PUBLICATIONS

Top 6: Best Smart Luggage [2020] Suitcases With Charging Ports for Travel; Nov. 1, 2020; https://www.youtube.com/watch?v=19iUS1n4aE8.

*Primary Examiner* — Natalie Huls
(74) *Attorney, Agent, or Firm* — ALLEN, DYER, DOPPELT + GILCHRIST, P.A.

(57) ABSTRACT

An electronic weight sensor assembly and a method of ascertaining the weight of a unit of luggage. The electronic weight sensor assembly comprises a pad, a detection assembly, a processor and a display. The detection assembly generally comprises a plurality of sensors disposed between two pairs of housings and mounting brackets. The mounting brackets are disposed on a top surface of the pad. The electronic weight sensor assembly may be disposed into and out of an expanded position and a collapsed position. In the collapsed position individual segments of the pad are disposed in confronting relation to one another. In the expanded position the segments are oppositely disposed to one another on a ground surface and the two front wheels of the luggage are disposed on the housings the detection assembly. The unit of luggage may be tilted for the detection assembly to ascertain a weight reading.

19 Claims, 19 Drawing Sheets

Related U.S. Application Data

(60) Provisional application No. 63/006,160, filed on Apr. 7, 2020.

(51) Int. Cl.
 *G01G 21/22*  (2006.01)
 *G01G 21/28*  (2006.01)

(56)  References Cited

U.S. PATENT DOCUMENTS

| | | | | | |
|---|---|---|---|---|---|
| 4,765,421 | A | * | 8/1988 | Newton | ................. G01G 19/44 |
| | | | | | 177/127 |
| 5,234,065 | A | * | 8/1993 | Schmidt | ............. G01G 19/4146 |
| | | | | | 177/208 |
| 5,414,225 | A | * | 5/1995 | Garfinkle | ............... G01G 21/22 |
| | | | | | 177/127 |
| 5,994,649 | A | * | 11/1999 | Garfinkle | ............. G01G 19/021 |
| | | | | | 177/253 |
| 7,022,920 | B2 | * | 4/2006 | Hulburt | .................. G01G 21/22 |
| | | | | | 177/126 |
| 7,741,569 | B2 | * | 6/2010 | Lin | ........................ G01G 21/22 |
| | | | | | 177/126 |
| 8,017,877 | B1 | * | 9/2011 | Cohen | .................... G01G 21/22 |
| | | | | | 177/126 |
| 2010/0300768 | A1 | | 12/2010 | Reiter | |
| 2015/0122555 | A1 | | 5/2015 | Meeks et al. | |
| 2016/0116327 | A1 | | 4/2016 | McCaskill | |
| 2017/0343409 | A1 | | 11/2017 | Natarajan | |
| 2018/0116361 | A1 | | 5/2018 | Anjum et al. | |
| 2021/0239513 | A1 | | 8/2021 | Karl | |
| 2021/0381880 | A1 | * | 12/2021 | Swanson | ............. G01G 21/283 |

* cited by examiner

Figure 8:
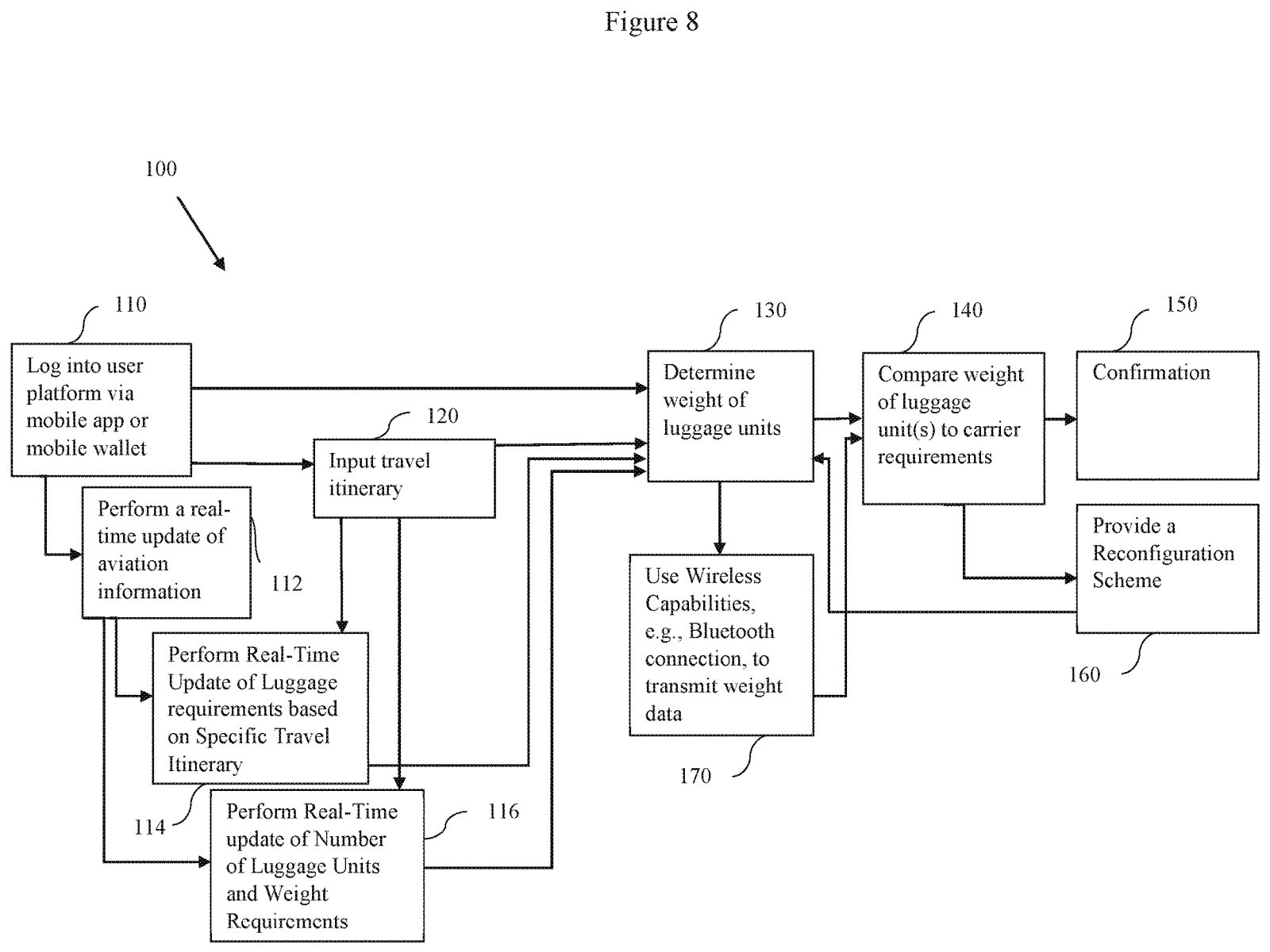

150 Confirmation

160 Provide a Reconfiguration Scheme

140 Compare weight of luggage unit(s) to carrier requirements

130 Determine weight of luggage units

170 Use Wireless Capabilities, e.g., Bluetooth connection, to transmit weight data 120 Input travel itinerary 110 Log into user platform via mobile app or mobile wallet 112 Perform a real-time update of aviation information 114 Perform Real-Time Update of Luggage requirements based on Specific Travel Itinerary 116 Perform Real-Time update of Number of Luggage Units and Weight Requirements

UNIT OF
LUGGAGE

201

UNIT OF
LUGGAGE

201

UNIT OF
LUGGAGE

201

ELECTRONIC WEIGHT SENSOR ASSEMBLY

FIELD OF INVENTION

The present invention relates to the field of electronic weight sensors for luggage.

BACKGROUND

Existing scales and other weight measuring devices do not generally provide for an efficient way to display luggage weight information and link it to a travel itinerary, let alone compare it to air carrier requirements to ensure conformance. Standalone mechanical and electronic scales have other drawbacks, including the fact that often times it is difficult to place luggage on top of the measuring surface. Further drawback associated with weight scales and existing pieces of luggage involve the fact that even if both are provided, it is often difficult to visually determine an accurate weight reading. This is especially the case in connection with mechanical scales. In addition, space management is generally a concern as existing scales are generally not portable or compact.

Accordingly, there is a need in the industry for a compact and portable electronic weight sensor assembly that overcomes the foregoing drawbacks and provides other advantages. A benefit in the industry would be realized by providing an electronic weight sensor assembly with a sensor assembly cooperatively configured with an indicator assembly to ascertain and visually display the weight of a unit(s) of luggage. A further benefit would be realized by providing an electronic weight sensor assembly with a lightweight pad that may be folded into a collapsed position for convenient and easy storage. Yet a further benefit would be provided by providing an electronic weight sensor assembly comprising a solar panel capable of transforming solar energy into electricity for the functioning of an internal battery system and/or of the various operative components electronic weight sensor assembly. An even further benefit would be provided by providing an electronic weight sensor assembly that may be cooperatively configured with a user platform to effectively manage the weight of one or more units of luggage and compare it to air carrier requirements and guidelines to ensure conformance.

SUMMARY

The present invention is directed to an electronic weight sensor assembly, which is primarily intended to be used in connection with determining the weight of one or more luggage unit(s). The electronic weight sensor assembly according to the present invention comprises a pad, a sensor assembly, and an indicator assembly. The electronic weight sensor assembly may also comprise a processing board or processing unit operatively configured with the sensors to ascertain the weight of the unit of luggage(s). The processing board or unit may also be configured with the display to show a weight reading of the unit of luggage(s). The present invention is also directed to a corresponding method of using the electronic weight sensor assembly to ascertain the weight of a unit of luggage(s) and save time and effort during checking procedures at an airport. The method is also intended to take into account travel restrictions and/or guidelines from air carriers, and to provide convenient and efficient means to ascertain luggage weight to comport with such restrictions and/or requirements.

The pad of the electronic weight sensor assembly may be provided in various dimensions and/or geometrical configurations according to the intended unit(s) of luggage to be weighted. A top surface of the pad should comprise a sufficient dimension to accommodate at least one, and in some embodiments two or more, electronic weight sensors. As an illustrative example, the pad may be provided with various groups of pad segments, at least some of which may be configured and dimensioned such that a corresponding sensor may be disposed on an inside thereof. It is within the scope of the present invention that the various segments of the pad be collectively disposable into a folded position and an expanded position. The folded position or non-operative position is intended to save space and provide for an efficient way of storing the electronic weight sensor assembly during periods of non-operation. Conversely, the electronic weight sensor assembly, and more specifically the various segments of the pad, may be collectively disposable into the expanded or operative position before placing a unit of luggage above the pad to ascertain a weight reading.

The indicator assembly generally comprises a display that is configured to show the weight of the unit of luggage being ascertained. The indicator assembly may also comprise a solar sensor. The electronic weight sensor assembly may comprise powering capabilities, for example, disposed on the pad, which may provide the necessary electricity for the functioning of the various operative components of the electronic weight sensor assembly. For example, the electronic weight sensor assembly may comprise one or more rechargeable battery units or may also comprise a solar sensor. A solar sensor with photovoltaic components may be disposed, for example, on the pad, and may be configured to transform solar energy into electricity to replenish the charge of a battery unit(s), or electricity that may be transmitted directly to the operative components of the electronic weight sensor. The indicator assembly may further comprise a status indicator.

Further features of the present invention comprise providing a tapered configuration of the pad. Such a tapered configuration may at least partially facilitate displacement of a unit of luggage from a floor or other surface to the top surface of the pad. A tapered configuration may be provided around one or more edges of the pad and is intended to provide a smooth transition from a floor or other surface to the top surface of the pad.

Additional features of the present invention comprise providing one or more tracks configured to at least partially facilitate movement of a unit(s) of luggage from a floor or other surface to the top surface of the pad. The tracks may function as a guide to the wheels of a unit of luggage and may comprise an indentation or recessed configuration. The tracks may comprise a variable width and/or length may be provided with a tapered configuration to further facilitate access to the top surface of the pad. The tracks may be adjacently disposed to one or more edges of the pad and/or adjacent to an electronic weight sensor(s).

Even further features of the present invention comprise implementing wireless capabilities configured to transmit weight data associated with one or readings of the innovative electronic weight sensor assembly. For example, weight data may be transmitted directly from the sensor assembly, i.e., via an electronic weight sensor(s), to the indicator assembly, i.e., to the display.

Yet additional features of the present invention comprise implementing a user platform cooperatively configured with the electronic weight sensor to determine whether a travel configuration comports to the luggage requirements and/or guidelines of air carriers. As used herein, a travel configuration refers to the weight and/or number of one or more units of luggage. The user platform may be accessed via a variety of devices, including mobile and/or desktop devices, and via a mobile application, and/or a web browser. It is within the scope of the present invention that weight data may be transmitted from the sensor assembly to the mobile or desktop device, for example via a server, data network, cloud computing, etc. The weight data may be similarly transmitted from the indicator assembly to a mobile or desktop device. The user platform may be accessed by one or more users to capture and/or process weight data associated with one or more actual readings of the innovative electronic weight sensor assembly. Thus, it is within the scope of the present invention that the user platform be continuously updated with information relating with a current and/or actual weigh reading(s) of the innovative electronic weight sensor assembly. A user may take one or more readings on the electronic weight sensor assembly and access the user platform to automatically store and/or record such weight readings. Alternatively, a user may manually input actual weight readings or otherwise data relating to the weight of a unit(s) of luggage. The user platform may then process such acquired and/or inputted weight data and compare it to the air carrier requirements associated with a specific travel itinerary.

Yet additional features of the present invention comprise incorporating real-time aviation information to the user platform. Aviation information may be included in a real-time database that may be accessed via the user platform. Aviation information may comprise commercial airline luggage restrictions, for example, number of allowed luggage units allowed on a given national or international flight, and its weight restrictions for on-board luggage and/or carry-on luggage. If the weight data does not comport to specific travel requirements or guidelines, the user platform may provide a reconfiguration scheme, including which specific units of luggage may need weight adjustments to conform to air carrier requirements.

The present invention is also directed towards a method of using the user platform and the electronic weight sensor assembly to ensure that the weight and number of a unit(s) of luggage associated with a specific travel itinerary conform to specific requirements and guidelines of air carriers. A user may login to the user platform and use the electronic weight sensor assembly to determine the weight of one or more units of luggage in connection with a specific travel itinerary. The user may also manually input weight data associated with the units of luggage, for example, including from a prior reading. The user may further input data relating to a specific travel itinerary. The user platform may be continuously updated with real-time information relating to specific air carrier restrictions and guidelines as to weight and/or number of units of luggage permitted on a given flight(s). The user platform may also determine whether an actual travel configuration comports to such air carrier requirements. If an actual travel configuration does not comport to specific air carrier requirements, the user platform may devise and recommend a reconfiguration scheme.

Additional embodiments of the present invention are directed to a compact and portable electronic weight sensor assembly for ascertaining the weight of a unit of luggage. The present invention is also directed to a corresponding method of using the compact and portable electronic weight sensor assembly. Such embodiments contemplate an electronic weight sensor assembly that is easy to dispose into and out of an operative or expanded position and an inoperative or collapsed position. The electronic weight sensor assembly should also be sufficiently compact to occupy a reduced space and fit into most carrying equipment with ease, e.g., suitcases, purses, bags, gym sacs, etc. The electronic weight sensor assembly generally comprises a pad with a top surface and a bottom surface. The pad comprises at least a first and a second segment connected to one another. A flexible or foldable connecting segment and/or another connection mechanism may be used to interconnect the first and the second segments. The first and second segment may be movable towards one another. The detection assembly generally comprises a plurality of sensors disposed respectively between a first housing and a first mounting bracket and between a second housing and a second mounting bracket. Accordingly, the detection assembly generally comprises two independent and individual pairs of housings, sensors and mounting brackets, each of which is generally disposed on a corresponding segment of the pad. Thus, each one of the housings may be cooperatively configured and dimensioned to at least partially cover and attach respectively their corresponding mounting brackets. Conversely, the housings are attached to the top surface of the pad. Further, the first housing and the second housing should be movable respectively to the first mounting bracket and the second mounting bracket.

The inventive electronic weight sensor assembly generally comprises a processing unit disposed between either the first housing and the first mounting bracket or the second housing and the second mounting bracket. The processing unit is operatively configured with each one of the first group of the plurality of sensors and each one of the second group of the plurality of sensors to ascertain the weight of the unit of luggage. The detection assembly generally comprises a display operatively connected to the processing unit and at least partially disposed between either the first housing and the first mounting bracket or the second housing and the second mounting bracket. The display and the processor are cooperatively configured to display the weight of the unit of luggage. Further, the processor is also operatively disposed with the sensors to ascertain the weight of the unit of luggage.

As briefly mentioned above, the electronic weight sensor assembly may be disposable into and out of an expanded position and a collapsed position. In the expanded position the segments of the pad may oppositely disposed to and coplanar to one another such that the pad may be placed on the ground and the two front wheels of the unit of luggage may be placed on the detection assembly. In the collapsed position, the first and second segments are disposed in confronting relation to one another so that the electronic weight sensor assembly may be stored. Accordingly, the electronic weight sensor assembly may be disposed in the expanded position on a ground surface adjacent to the unit of luggage. Thereafter, each the front wheels of the unit of luggage may be placed on corresponding individual pairs of the detection assembly. Once the wheels of the unit or luggage are on the electronic weight sensor assembly, the user may pivot or otherwise tilt the unit of luggage about the front wheels towards the front at least beyond a vertical axis defined at the approximate center of the front wheels. In turn, the detection assembly should detect incremental weight readings until the approximate center of the weight of the unit of luggage reaches an apex, i.e., around the vertical axis. Such weight readings should decrease once the approximate center of the weight of the unit of luggage is beyond the apex. The electronic weight sensor assembly is structured to ascertain a highest weight reading upon such tilting motion, which is indicative of the entire weight of the unit of luggage.

BRIEF DESCRIPTION OF THE DRAWINGS

FIG. 8 is a diagrammatic representation of the method according to the present invention of using a user platform and an electronic weight sensor assembly to verify the weight of a smart luggage unit(s).

DETAILED DESCRIPTION

Figure 1:
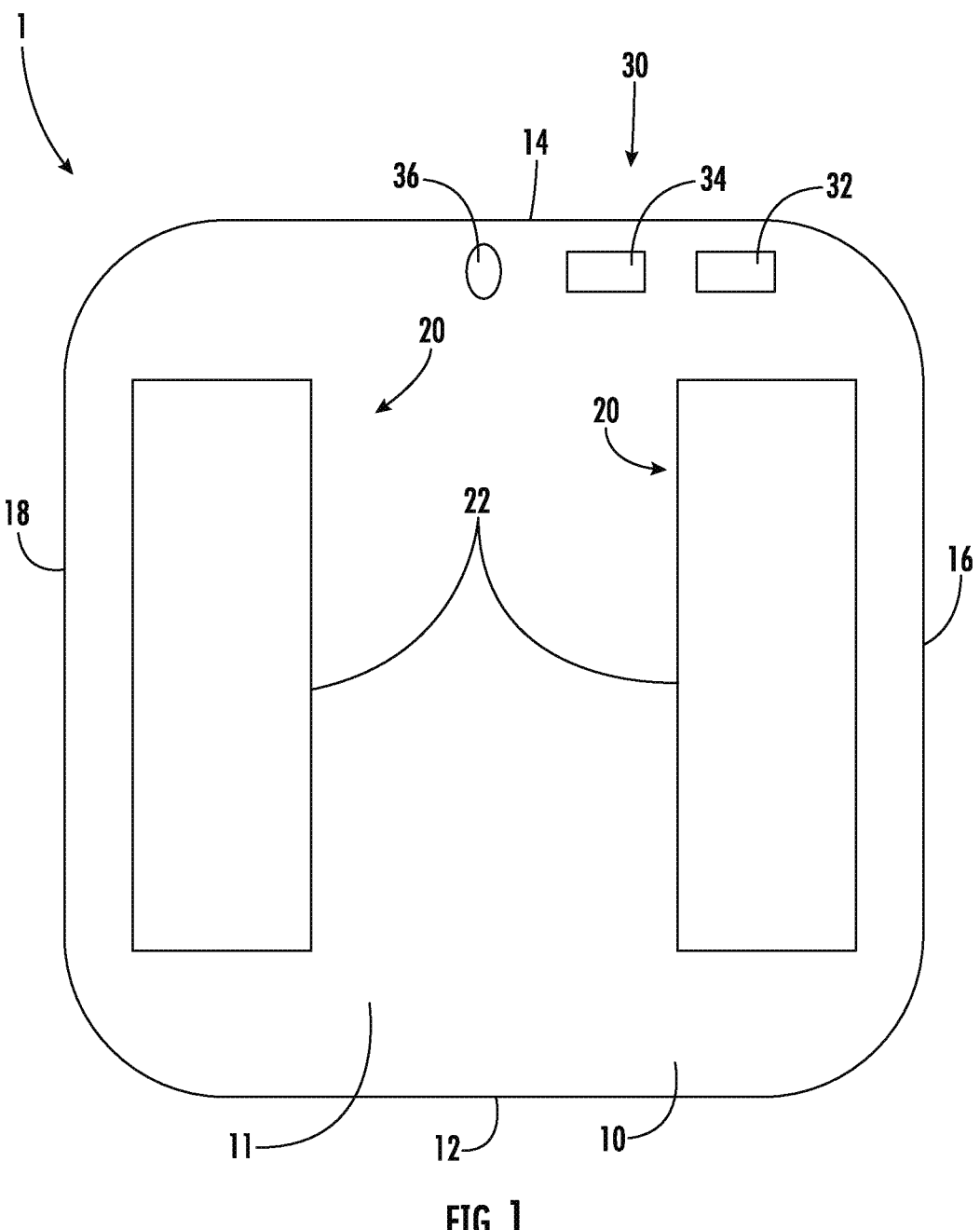
FIG. 1 is a top view of one embodiment of the electronic weight sensor assembly according to the present invention.

With initial reference to FIGS. 1-7, the present invention is directed to an electronic weight sensor assembly 1. With reference to FIG. 8, the present invention is also directed towards a method 100 of using the electronic weight sensor assembly 1 to ascertain the weight of one or more units of luggage and ensure compliance with air carriers and/or guidelines. The electronic weight sensor assembly 1 assembly is primarily intended to be used in connection with determining the weight of a luggage unit(s), but it may be used to determine the weight of other components or items that may be placed on the electronic weight sensor assembly 1. The electronic weight sensor assembly 1 according to the present invention comprises a pad 10, a sensor assembly 20, an indicator assembly 30 and a processing unit 60.

Figure 2:
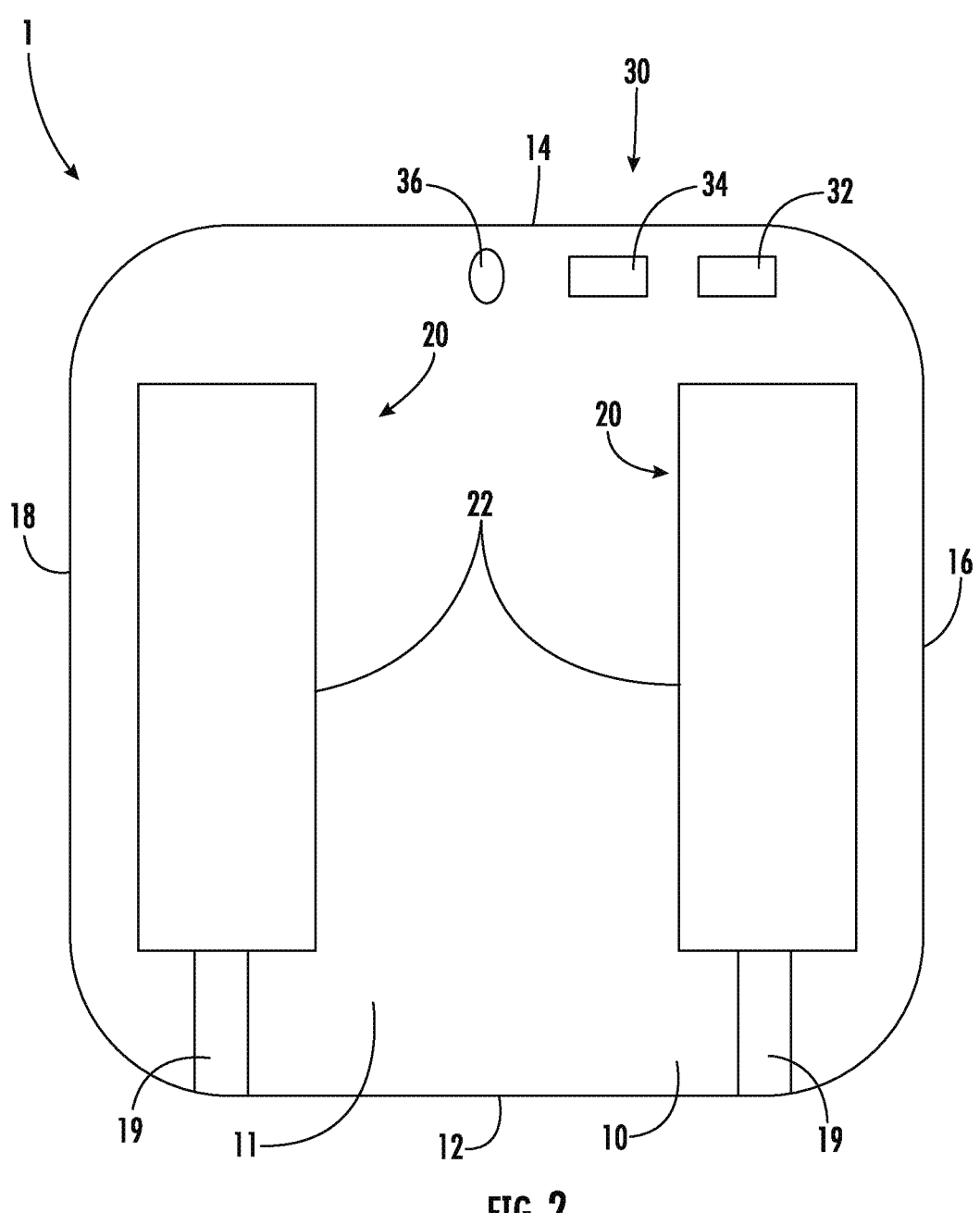
FIG. 2 is a top view of another embodiment of the electronic weight sensor assembly according to the present invention comprising tracks disposed on the pad.

With reference to FIGS. 1-7, and as mentioned above, the electronic weight sensor assembly 1 comprises a pad 10. The pad 10 may be provided in various shapes and sizes according to intended geometrical configurations of the specific luggage unit(s) or other items that are intended to the weighed. The illustrative embodiments of FIGS. 1-2 show pads 10 comprising a substantially rectangular shape with round corners. The illustrative embodiments of FIGS. 1-2 are only exemplary not limiting of the shape of the pad 10 as other shapes and/or geometrical configurations may be provided. For example, other possible shapes of the pad are show in FIGS. 4-7. The top surface 11 of the pad 10 should comprise a sufficient dimension to accommodate at least one electronic weight sensor 21, 22, 23 and/or 24, which will be described later. As shown in the illustrative embodiments as represented in FIGS. 1-2, the top surface 11 comprises a sufficient dimension to accommodate the size of two electronic weight sensors, both indicated as 22 in these figures. In alternative embodiments, the top surface 11 may comprise a sufficient dimension to accommodate the size of more than two electronic weight sensors, e.g., 21, 22, 23 and/or 24 as shown in FIGS. 4-7. The pad 10 is generally provided with a first side edge 16 and a second side edge 18, as well as a front edge 12 and a back edge 14. Furthermore, the pad 10 should be lightweight, that is, the pad 10 should comprise a lesser density material. For example, the pad 10 may comprise synthetic polymer fabrics with a reduced density, and with a cover fabric on the top surface 11 and/or on an oppositely disposed bottom surface that may be placed on the floor. Further, the material of the pad 10 should allow for folding of the pad 10 in at least one direction such that the electronic weight sensor assembly 1 may be conveniently stored. For example, the electronic weight sensor assembly 1 may be folded into a collapsed or folded position, which will be explained later, such that it may be placed inside of a unit of luggage, pouch, case, bag, purse, etc. The electronic weight sensor assembly 1 may be folded and placed inside of a unit of luggage such that it may be used at various points in connection with a travel itinerary, as will be explained later. It is also within the scope of the present invention that other components, for example, the electronic weight sensors 21, 22, 23 and/or 24 may also be provided comprising a relatively low weight, such that the overall weight of the electronic weight sensor assembly 1 comprises an at least partially reduced weight.

The electronic weight sensor(s) 21, 22, 23 and/or 24 according to the present invention may comprise a variety of sensor technologies. As an illustrative example, the weight sensors may comprise a load cell, e.g., a force transducer, which is configured to convert compression or pressure into an electrical signal that may be measured and/or standardized. For example, as a force applied to the load cell increases, the electrical signal may change proportionally. Thereafter the electrical signal(s) may be processed and/or converted into a corresponding weight value. As a further example, a force sensing resistor (FSR) may be incorporated. A force sensing resistor (FSR) may comprise a material configured to change its resistance when a force, pressure, or mechanical stress is applied. The change in resistance may be converted into an electrical signal, e.g., via the processing unit 60. The size and/or shape of the electronic weight sensor(s) 21, 22, 23 and/or 24 may be dimensioned and configured according to the specific size of the pad 10.

As is shown in the illustrative embodiments of FIG. 4-7, the present invention comprises a processing unit 60. The processing unit 60 and/or processing board 60, may comprise a microprocessor, which may be cooperatively configured with sensors, i.e., 21, 22, 23 and/or 24, of the sensor assembly 20 to convert a pressure, force, stress, or change thereof, into an electrical signal representative of an associated weight. Furthermore, the processing unit 60 may also be operatively configured with the indicator assembly 30, e.g. with the display 34 to displace such weight as may be associated with the pressure, force, stress and/or change thereof. It is within the scope of the present invention that the processing unit 60 and/or components thereof comprise at least a minimum level of flexibility that allows for an integration into the pad 10 and/or sensors 21, 22, 23 and/or 24. It is also within the scope of the present invention that the processing unit 60 be configured with a programmable code or executable computer software for the purposes of integrating the sensors 21, 22, 23 and/or 24 and/or indicator assembly 30. The processing unit 60 may comprise an open-source hardware and/or software package that includes single-board microcontrollers and microcontroller kits. By way of example only, the processing unit 60 may comprise a processing board manufactured by Audino, LLC, and/or under the brand Audino®.

With reference again to FIGS. 1-2, and as mentioned above, electronic weight sensor assembly 1 comprises an indicator assembly 30. The indicator assembly 30 generally comprises a display 34, which is intended to show the weight of the specific luggage or other item that is intended to be weighed, which for simplicity are herein referred to as "unit of luggage" or "units of luggage". The indicator assembly 30 may comprise a solar sensor 32. It is within the scope of the present invention that the electronic weight sensor assembly 1 also comprise powering capabilities. Such powering capabilities are intended to provide the necessary electricity for the functioning of the various operative components of the electronic weight sensor assembly 1, including the electronic weight sensor(s) 22, the display 34, and/or attendant components that enable an operative communication between them. Thus, the electronic weight sensor assembly 1 may comprise one or more rechargeable battery units. For example, the battery units may be disposed on an inside of the pad 10.

As is shown in FIGS. 1-2, the indicator assembly 30 may comprise a solar sensor 32. A solar sensor 32 may be provided with photovoltaic components (e.g., a photovoltaic cell panel configured to capture solar energy and transform it into electricity). The solar sensor 32 may be configured to transform solar energy into electricity to replenish the charge of a battery unit(s). The electricity generated by the solar sensor 32 may also be transmitted directly to the operative components of the electronic weight sensor 1, e.g., electronic weight sensor(s) 22, the display 34, attendant components, etc.

With further reference to FIGS. 1-2, the indicator assembly 30 may further comprise a status indicator 36, as may be used in connection with the display 34. The status indicator 36 is primarily intended to indicate an "on" status or "off" status of the sensor assembly 20 and/or the indicator assembly 30. More precisely, the status indicator 36 may indicate an "on" status or an "off" status of the electronic weight sensors, i.e., 21, 22, 23 and/or 24, the displays 34 and/or the display 32. The status indicator 36 may be provided with a visual indicator, for example, LED lighting.

Figure 3:
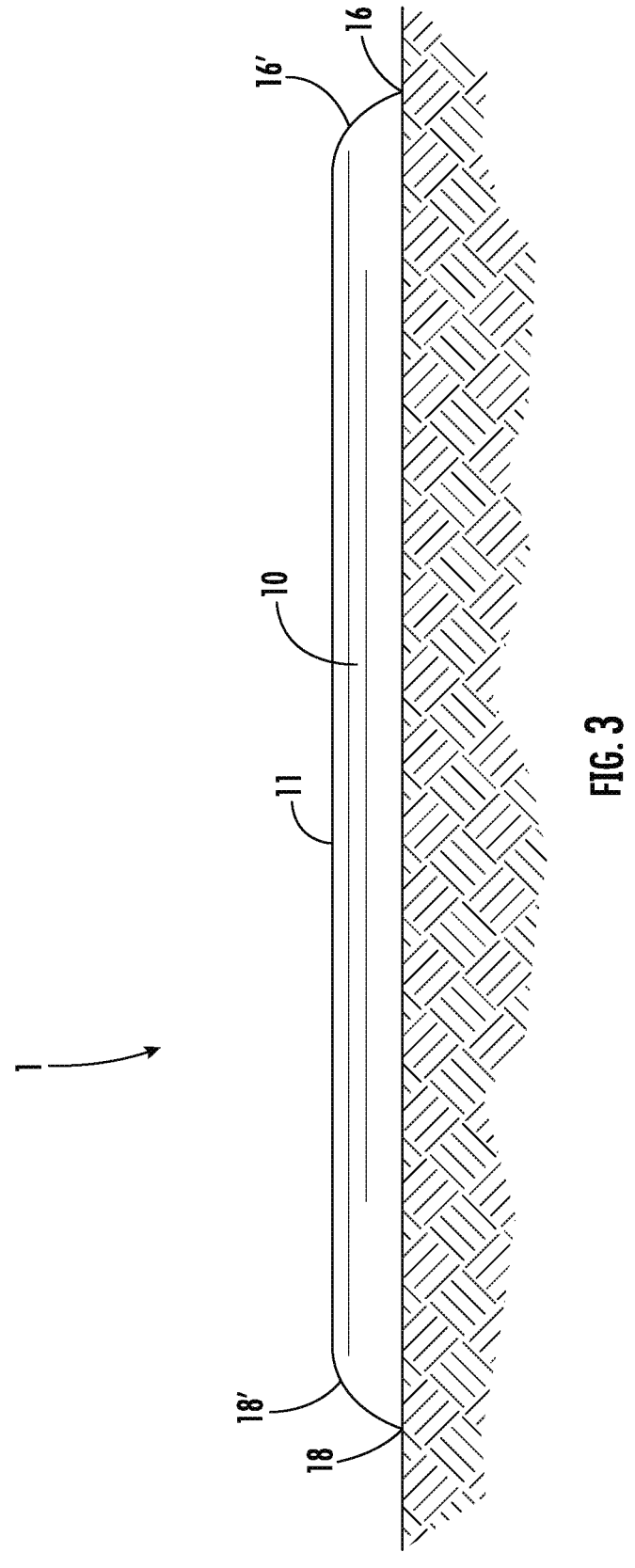
FIG. 3 is a side view of yet another embodiment of the electronic weight sensor assembly according to the present invention comprising a tapered configuration on one of the side edges of the pad.

As is shown in FIG. 3, further features of the present invention comprise providing a tapered configuration of the pad 10 configured to at least partially facilitate displacement of a unit of luggage from a floor or other surface to the top surface 11 of the pad 10. As is shown in FIG. 3, a tapered configuration 18' may be provided across the second side edge 18. The tapered configuration 18' is intended to provide a smooth transition from a floor or other underlying surface to the pad 10. As an illustrative embodiment, the tapered configuration 18' may comprise a slope of about 10 degrees to about 30 degrees from the horizontal plane. However, this range is not necessarily limiting as the tapered configuration 18' may comprise other angles of inclination. In addition, the tapered configuration 18' should transition from the approximate thickness of the pad 10 to a nearly imperceptible width near the second side edge 18. Other tapered configurations may also be provided at other edges of the pad 10. For example, a tapered configuration 16' may be provided the first side edge 16. Furthermore, tapered configurations may also be provided at the front edge 12 and a back edge 14.

With particular reference to FIG. 2, the pad 10 according to the electronic weight sensor 1 of the present invention may comprise one or more tracks 19. The track(s) 19 may be configured to further provide access to the pad 10. The tracks 19 are primarily intended to function as a guide to the wheels of a unit of luggage. Accordingly, the tracks 19 may comprise an indentation or recessed configuration. Furthermore, the tracks 19 may also comprise a tapered configuration similar to that described above, e.g., 18' and/or 16'. The tracks 19 may be disposed on the pad 10 along one or more edges thereof, e.g., 12, 14, 16 and/or 18. As shown in the illustrative embodiment of FIG. 2, the tracks 19 may be disposed on the pad 10 along a front edge 12. As shown in the illustrative embodiment of FIG. 2, each track 19 may be disposed in adjacent relation to a corresponding electronic weight sensor, e.g., 22. As is further shown in the illustrative embodiment of FIG. 2, each track 19 may also be disposed in adjacent relation to the front edge 12. As is also shown in the illustrative embodiment of FIG. 2, the tracks 19 may run in a direction parallel to the front edge 12 and the back edge 14. However, other configurations are possible and include the tracks 19 running in a direction from the first edge 16 to the second edge 18. Additionally, as is shown in FIG. 2, two tracks may be provided. Two tracks, however, are not strictly required as only one track 19 or more than two tracks 19 may also be provided. Additionally, the relative thickness of the tracks 19 may be adjusted according to the size of the pad 10 or to an intended size of the luggage unit(s).

Further features of the present invention comprise providing and/or implementing wireless capabilities to transmit weight data associated with one or readings of the innovative electronic weight sensor assembly 1. Wireless capabilities, including, but not limited to, Bluetooth®, Wi-Fi, LAN, Near-Field Communication (NFC) capabilities, may be used to transmit data associated with one or more weight readings. For example, weight data may be transmitted directly from the sensor assembly 20, i.e., via an electronic weight sensor, i.e., 21, 22, 23 and/or 24, to the indicator assembly 30, i.e., to the display 34. With reference to FIG. 13A, an alternative embodiment of the present invention is directed to a portable electronic weight sensor assembly 201 comprising independent segments 216 and 218 communicably connected to one another via wireless capabilities 250. Here, the pad 210 may be provided without a connecting segment 212 such that both segments 216 and 218 may be disposed in spaced apart relation to one another to ascertain a weight reading of the unit of luggage. This is advantageous as the spacing between the segments 216 and 218 may be manually adjusted to correspond to the spacing between the wheels of the unit of luggage. As such, data associated with a weight reading may be transmitted between sensor assemblies 220 and between components thereof, including the sensors 235 and/or processor(s).

Even additional features of the present invention comprise implementing a user platform cooperatively configured with the electronic weight sensor 1. The user platform may be accessed via a variety of devices, including mobile and/or desktop devices, and via a mobile application, and/or a web browser. The user platform may be accessed by one or more users via an application installed on a mobile device to allow users to check real-time data associated with one or more weight readings. Alternatively, and in addition to or in lieu of a standalone mobile application installed on a device, various features of the user platform may be conveniently accessed and/or stored on a device via a mobile wallet or through a web server(s) accessible via a mobile device. As such, weight data may be transmitted wirelessly from the sensor assembly 20 to the mobile or desktop device, for example via a server, data network, cloud computing, etc. The weight data may be similarly transmitted wirelessly from the indicator assembly 30 to a mobile or desktop device.

The user platform may also be provided with global positioning system (GPS) tracking capabilities, as may be required in connection with planning and/or implementing a travel itinerary. Such GPS tracking capabilities may comprise internal hardware components disposed on a luggage unit, a mobile device, of the electronic weight sensor assembly 1. For example, such internal components may comprise a receiver configured to obtain radio signals and ascertain a current location of a luggage unit, mobile device, etc. Such GPS tracking capabilities may also be used to ascertain a location of one or more units of luggage, for example, if they are misplaced, lost, sent to an incorrect location, etc. Further, such GPS tracking capabilities may be configured to ascertain data relating to a specific location(s) of one or more units of luggage or mobile devices, including various positions of travel in connection with a travel itinerary. Such GPS data may be displayed on the user platform such that a location of a unit of luggage or a mobile device may be determined at any given point.

The user platform may be accessed by one or more users to access weight data pursuant to one or more actual readings of the innovative electronic weight sensor assembly 1. Thus, it is within the scope of the present invention that the user platform be continuously updated in "real time", which generally may involve updating with up-to-date or recent information relating with to an actual weight reading(s) of a unit of luggage using the innovative electronic weight sensor assembly 1. It is also within the scope of the present invention that information relating to a weight reading(s) may be selectively transmitted and/or controlled by the user(s). That is, a user may take one or more readings on the electronic weight sensor assembly 1 and access the user platform to automatically store and/or record such readings. Alternatively, a user may manually input actual weight readings or otherwise data relating to the weight of a unit(s) of luggage. The user platform may then process such acquired and/or inputted in connection with a specific travel itinerary, as will be explained hereinafter.

Even further features of the present invention comprise incorporating real-time aviation information to the user platform. Such aviation information may be included in a real-time database that may be accessed via the user platform. Aviation information may comprise commercial airline luggage restrictions, for example, number of allowed luggage units allowed on a given national or international flight, and its weight restrictions for on-board luggage and/or carry-on luggage. Restrictions in the number and weight of luggage may vary according to each specific commercial airline and/or the nature of the underlying flight, for example whether it is within a state, within a country, between more than one country, and/or the estimated travel time. Thus, the user platform may be accessed to compare whether the weight data associated with one or more weight readings comports to these travel requirements and/or guidelines from air carriers. If the weight data does not comport to specific travel requirements or guidelines, the user platform may indicate which specific units of luggage may need weight adjustments, and how much such adjustments may need to be. The user platform may also provide information with additional carrier fees associated with the current weight configuration of one or more units of luggage. Accordingly, it is within the scope of the present invention that the user platform be accessed to input specific travel information, e.g., airline, flight number, destination, city of origin, current flight, future flights, number of passengers, etc., and link this information with one or more units of luggage and/or corresponding weight readings. As such, the user platform may provide for an efficient way to confirm that one or more travel configurations, that is the weight information associated with one or more readings and/or associated units of luggage comport to the specific carrier requirements in connection with one or more travel itineraries. The user platform is also intended to be an easy to access resource to implement a weight reconfiguration scheme, i.e., to make weight adjustments to one or more units of luggage, as may become necessary to comport to such requirements and/or limit additional carrier fees associated with a specific travel itinerary.

Figure 4:
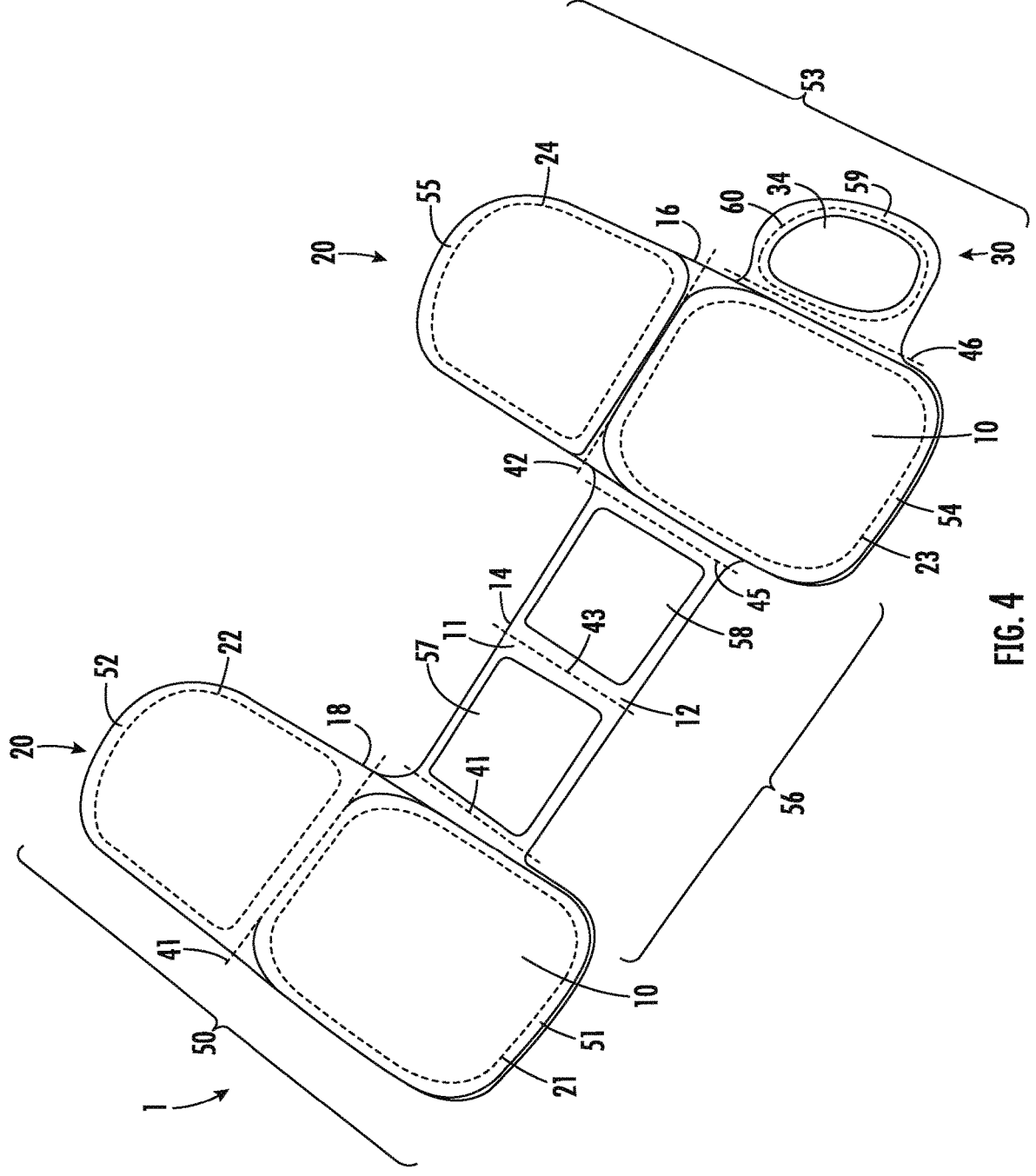
FIG. 4 is a perspective view of one embodiment of the electronic weight sensor assembly according to the present invention disposed in the expanded position.
Figure 5:
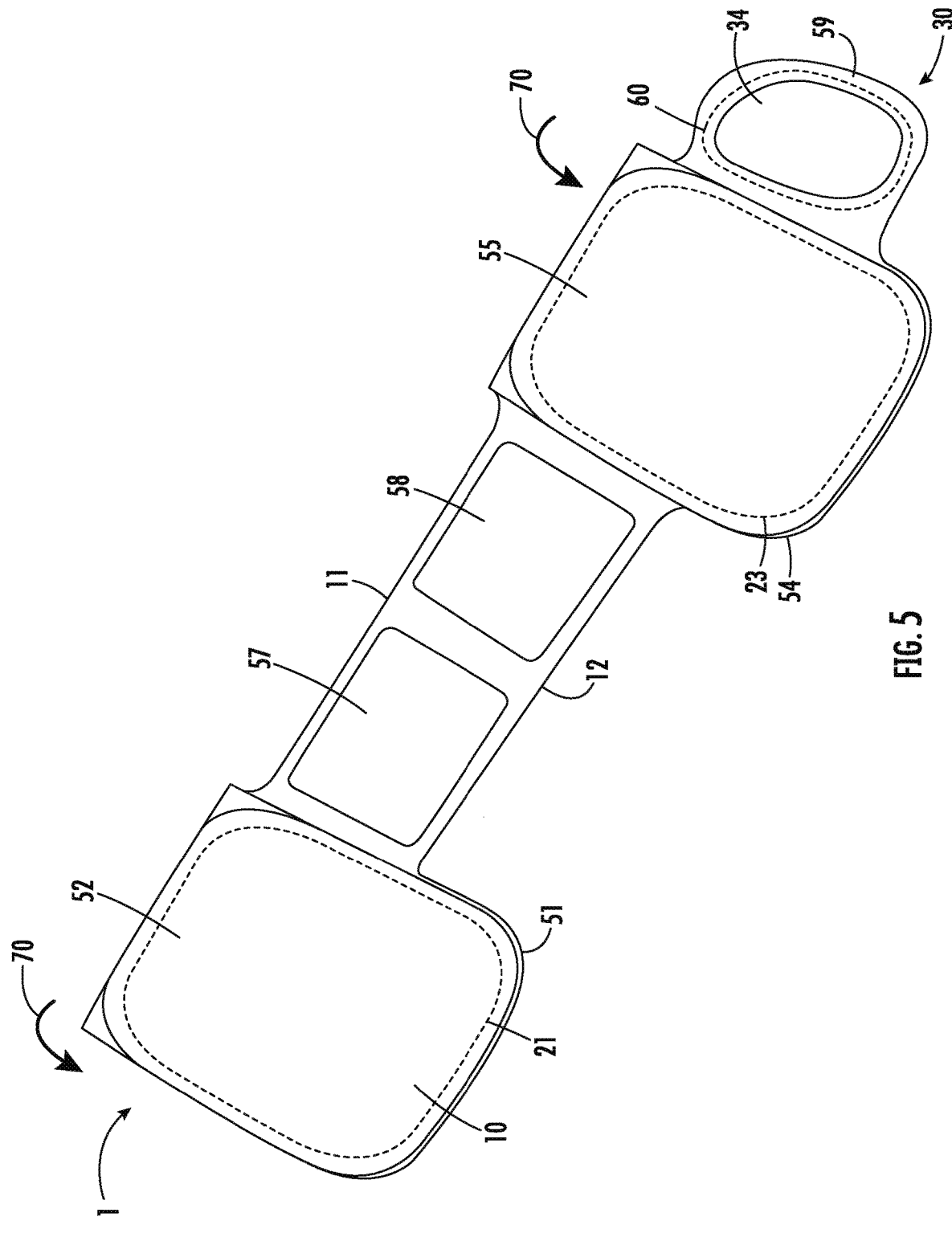
FIG. 5 is a perspective view of yet another embodiment of the electronic weight sensor assembly according to the present invention.
Figure 6:
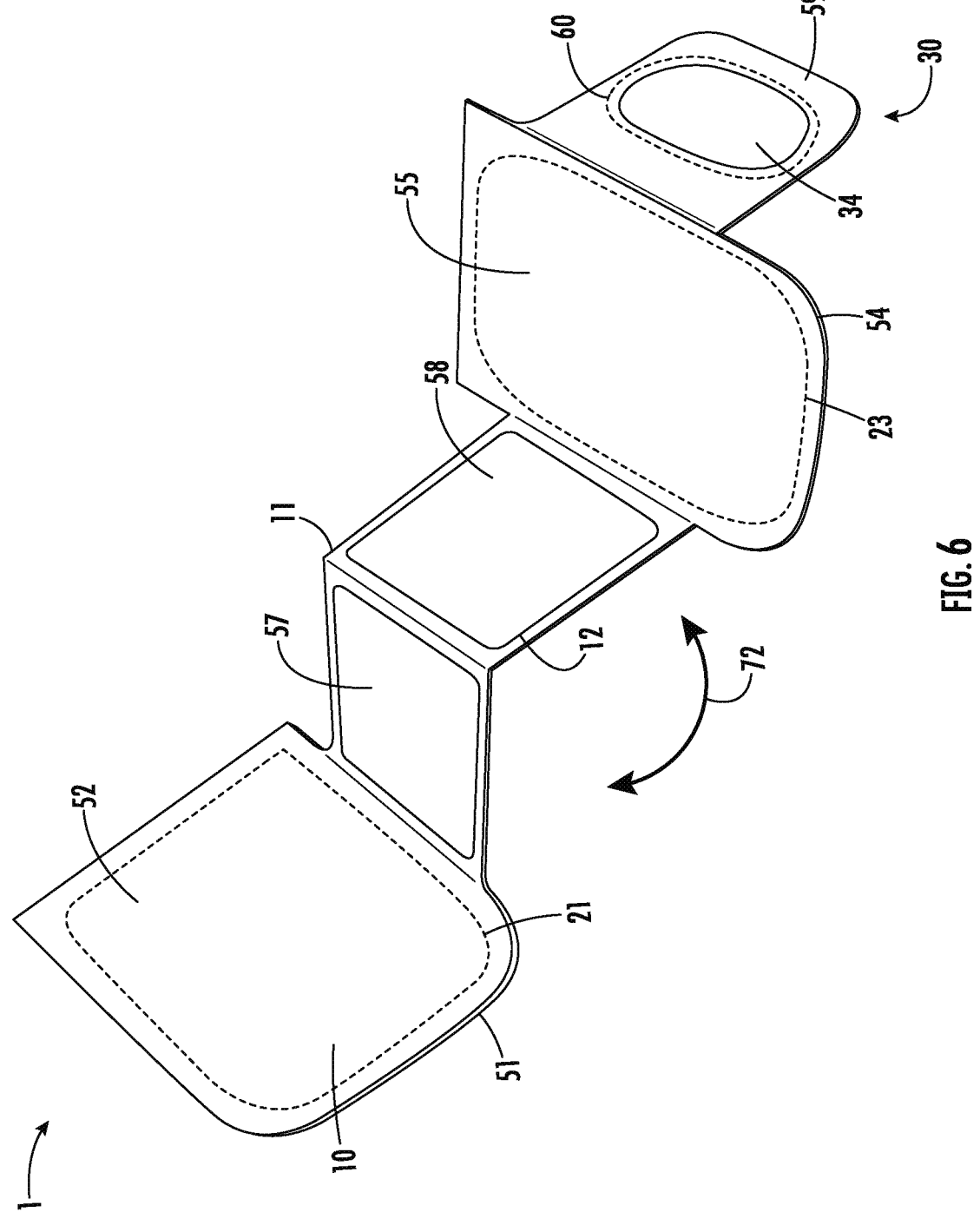
FIG. 6 is a perspective view of an even further embodiment of the electronic weight sensor assembly according to the present invention.

With reference now to FIGS. 4-7, additional features of the present invention further comprise the electronic weight sensor assembly 1 being disposable into and out of an expanded position and a folded position. It is within the scope of the present invention that the electronic weight sensor assembly 1 be disposable into an expanded position, i.e., FIG. 4, and that as such, it may be used to determine or ascertain the weight of an intended unit of luggage. The inventive electronic weight sensor assembly 1 may also be disposable into a collapsed position, i.e., FIG. 7, so that it may be conveniently stored, placed inside of a pouch or case, or placed inside of a bag or unit of luggage. As such, the electronic weight sensor assembly 1 may be provided with several groups of pad segments, shown in FIG. 4 as 50, 53 and 56. The groups of pad segments 50, 53 and/or 56 may comprise one or two pad segments. For example, a first group of pad segments 50 may comprise a first left segment 51 and/or a second left segment 52. Also as an example, the second group of pad segments 53 may comprise a first right segment 54 and/or a second right segment 55. The second left segment 52 may be connected to and movable to the first left segment 51, for example, about a first fold line 41 of the pad. Similarly, the second right segment 55 may be connected to and movable to the first right segment 54, for example, about a second fold line 42. As such, and as is shown in FIGS. 5-6, the second right segment 52 may be disposed in confronting relation to the first right segment 51, and/or the second right segment 55 may be disposed in confronting relation to the second left segment 54. As such, the second left segment 52 and/or the second right segment 55 may be moved in the direction 70, which is shown in FIG. 5.

As is shown at least in FIGS. 4-6, a third group of pad segments 56 may be provided with at least one segment, and in some embodiments with a first central segment 57 and/or a second central segment 58. The first central segment 57 may be connected and movable to the second central segment about a third fold line 43 of the pad 10. As such, the first central segment 57 and the second central segment 58 may be moved in the direction 72 as shown in FIG. 6, such that they may ultimately be disposed in confronting relation to one another. The first group of pad segments 50, including the first left segment 51, may be adjacently disposed and movable to the third group of pad segments 56, including the first central segment 57, for example about a fourth fold line 44. Similarly, the second group of pad segments 53, including the first right segment 54 may be adjacently disposed and movable to the third group of pad segments 56, including the second central segment 58, for example about a fifth fold line 45. Additionally a display segment 59 may be provided to store the indicator assembly 30, including display 34, and/or other components such as the processing unit 60. It is also within the scope of the present invention that the display segment 59 be movable with respect to an adjacent group of segments, e.g., the second group of segments 53 and/or the first right segment 54, for example about a sixth fold line 46.

Figure 7:
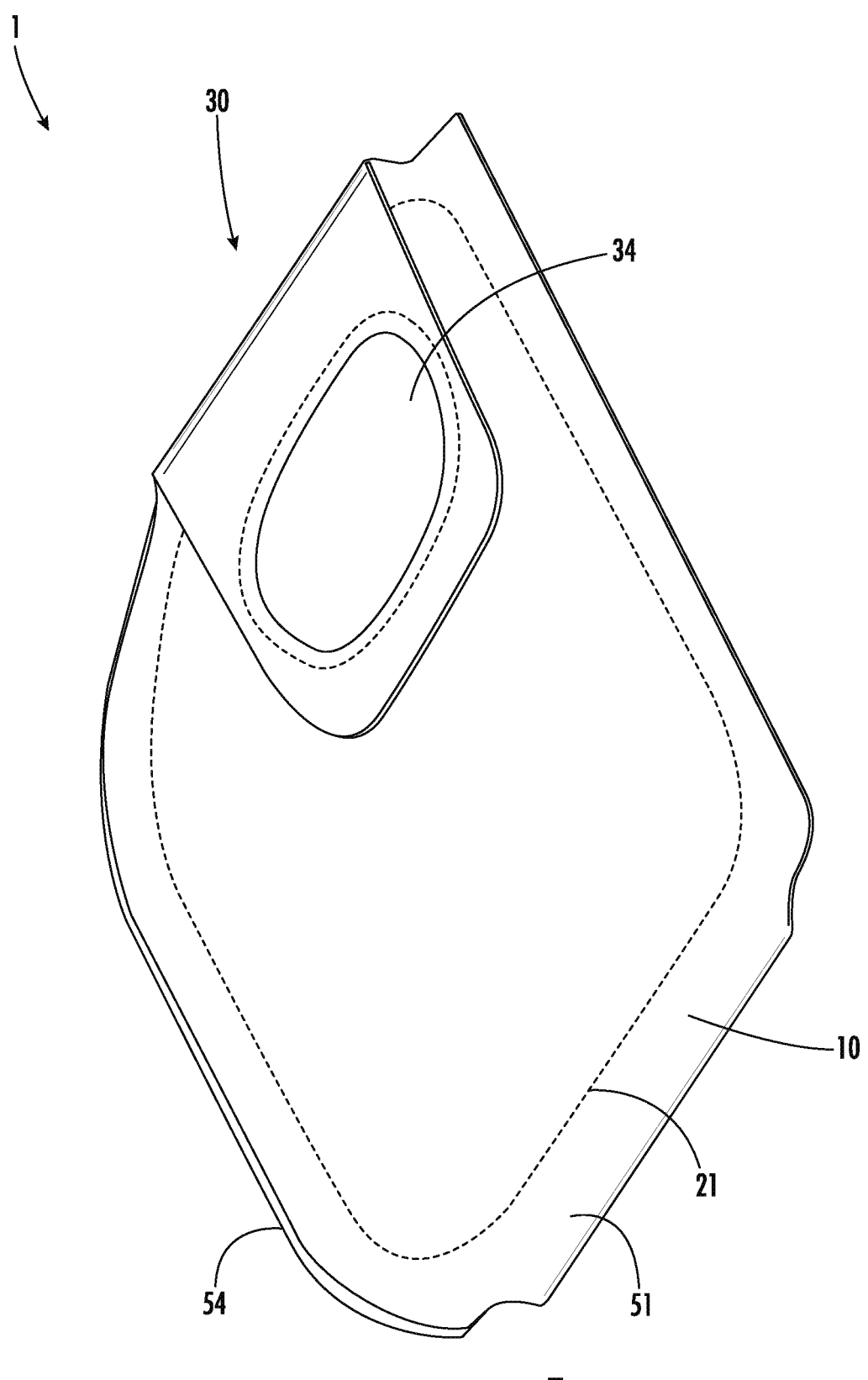
FIG. 7 is a perspective view of one embodiment of the electronic weight sensor assembly according to the present invention disposed in the expanded position.

FIG. 7 shows an illustrative embodiment of the electronic weight sensor assembly disposed in the non-operative or collapsed position. The collapsed position primarily comprises at least the first left segment 51 disposed in confronting relation to one of the segments of the third group of pad segments 56. For example, in the collapsed position, the first left segment 51 may be disposed in confronting relation to the first central segment 57. Similarly, in the collapsed position, at least the first right segment 54 should be disposed in confronting relation to one of the segments of the third group of pad segments 56. For example, in the collapsed position, the first right segment 54 may be disposed in confronting relation to the second central segment 58. Furthermore, in the collapsed position the second left segment 52 and/or the second right segment 55 may be respectively disposed in confronting relation to the first left segment 51 and/or the first right segment 54. However, this is not strictly necessary, including in embodiments of the electronic weight sensor assembly 1 not comprising a second left segment 52 and/or a second right segment 55. Optionally, in the collapsed position, the display segment 59 may be disposed in confronting relation to one or more of the other segments 51, 52, 54 and/or 55. It is further contemplated that in order to achieve the collapsed position, that the pad 10 comprise a predetermined thickness that enables movement between adjacent segments, and further, an efficient and/or compact disposition of the electronic weight sensor assembly 10. Accordingly, the thickness of the pad 10 may be about two (2) millimeters to about four (4) millimeters. In at least one embodiments, the thickness of the pad 10 may be less than or equal to about four (4) millimeters. However, these thicknesses are not limiting as other thicknesses of the pad 10 and or specific segments may are also contemplated.

Also with reference to FIGS. 4-7, and as mentioned above the electronic weight sensor assembly 1 comprises a sensor assembly 20. The sensor assembly 20 may comprise a plurality of weight sensors, which may be disposed on a corresponding pad segment. It is within the scope of the present invention that a weight sensor, i.e., 21, 22, 23 and/or 24 be disposed on an inside of a corresponding pad segment, i.e., 51, 52, 54 and/or 55. Further, each weight sensor 21, 22, 23 and/or 24 should also be movable in the same direction of its corresponding pad segment, i.e., 51, 52, 54 and/or 55. Thus, when in the expanded position, i.e., FIG. 4, the sensors 21, 22, 23 and/or 24 should provide for different sections of contact with a specific unit of luggage, for example, at corners of the unit of luggage that correspond to the location of the wheels of the unit of luggage. Accordingly, each sensor 21, 22, 23 and/or 24 should be configured to ascertain at least a portion of the overall weight of the unit of luggage. It is within the scope of the present authority all of the sensors in combination ascertain substantially all of the weight of the specific unit of luggage. That is each sensor should be configured to ascertain a portion of the weight of the unit of luggage, and in combination all of the sensors should ascertain the overall weight of the unit of luggage, which may then be displayed on the display 34.

With reference now to FIG. 8, and as mentioned above, the present invention is also directed towards a method 100 of ensuring that the weight and number of a unit(s) of luggage associated with a given travel itinerary conform to specific requirements and guidelines of air carriers. Furthermore, embodiments of the method 100 further comprise incorporating the inventive electronic weight sensor assembly 1 to ensure conformance to requirements and guidelines of air carriers. Accordingly, the method 100 comprises logging into a user platform 110 as described herein. This may be accomplished via a mobile or desktop device, for example via a mobile application, web browser, or via a mobile wallet. The method 100 further comprises preforming a real-time update of aviation information 112 to the user platform. That is, a database accessible by, or otherwise associated with, the user platform, may be updated with specific requirements and/or guidelines of air carriers, for example, commercial airlines, airport regulations, etc. The method 100 may comprise a user inputting a flight itinerary 120, and performing a real-time update of specific requirements and/or guidelines based on the specific travel or flight itinerary 114. As used herein, inputting a flight itinerary 120 may comprise synching, creating, or otherwise enabling a flight itinerary or travel ticket to be accessible via the user platform, and/or also by airport staff, e.g., airline staff, TSA, security, etc. Furthermore, the method 100 may comprise performing a real-time update of the number and weight of permissible luggage units of a specific travel itinerary 116. The method 100 further comprises determining the weight of at least one luggage unit 130. For example, the method 100 may comprise providing and using the electronic weight sensor assembly 1 to determine the weight of at least one luggage unit 130.

Wireless capabilities, for example Bluetooth connectivity, may be used to transmit data relating with the weight of one or more luggage units, for example from the electronic weight sensor assembly 1 to the user platform. Data relating to the weight of one or more luggage units may also be transmitted, for example, to a server, data network, cloud computing, etc., of the air carrier. For example, data relating to the weight of a luggage unit(s) may be associated with a travel itinerary or an actual ticket, e.g., a ticket that may be printed or that be accessed through a mobile app, mobile wallet, web browser, etc. The method 100 further comprises comparing the weight data of one or more weighted luggage units to air carrier requirements and guidelines 140. For example, it is within the scope of the present invention that the air carrier staff and/or airport staff, have immediate access to the data relating to the weight of a luggage unit(s), as may be ascertained using the inventive electronic weight sensor assembly 1, for example, prior to arrival at the airport. This may at least partially reduce the amount of time associated with baggage check-in, and may also reduce the time and effort the staff will have otherwise needed to weight a unit(s) of luggage upon arrival at the airport. This may also at least partially reduce the staff's physical contact with the luggage unit(s) and may be used to expedite luggage check-in procedures, for example, via first class travel, pre-approved check-in, TSA, etc. For example, an curbside check-in kiosk, or an inside check-in kiosk, may have access to the weight of a unit(s) of luggage the moment a user uses the electronic weight sensor assembly 1 to ascertain the weight thereof. As an example, the user may access the user platform to record or otherwise save a weight reading of the electronic weight sensor assembly 1 of a unit of luggage(s), and that information may be linked or associated with a ticket or travel itinerary in real-time.

If the actual weight and number of the smart luggage units is in conformance to the air carrier requirements and guidelines, the method 100 comprises providing a confirmation 150. If the actual weight and number of the smart luggage units is not in conformance to the air carrier requirements and guidelines, the method 100 may comprise implementing or providing a reconfiguration scheme 160. It is contemplated that with a reconfiguration scheme, that the user may adjust the weight and/or number of the luggage units such that their weight may be determined again by the electronic weight sensor assembly 1 to verify and/or ensure conformance to the air carrier requirements and guidelines. For example, the reconfiguration scheme may comprise an alarm sent to the user via the user platform, i.e., on a mobile application or a mobile wallet, and it may also indicate which unit of luggage may not conform to the specific travel requirements and/or guidelines. This process may be repeated until the weight and/or number of the smart luggage assemblies are in conformance with the air carrier requirements.

With reference now to FIGS. 9-13, the present invention is also directed, respectively to another embodiment of the portable electronic weight sensor assembly 201, which is intended to provide for a more compact configuration or otherwise option. With reference to FIGS. 14-18, the present invention is also directed to a corresponding method 300 of using the inventive portable electronic weight sensor assembly 201. As is perhaps best shown in FIG. 9, the portable electronic weight sensor assembly 201 according to the present invention comprises a pad 210 with a top surface 214 and a bottom surface 215. The pad 210 may comprise a variety of natural or synthetic materials, or combinations thereof, e.g., leather and/or a synthetic polymer fabric with a reduced density, and with a cover fabric on the top surface 11 and/or on an oppositely disposed bottom surface that may be placed on the floor or ground surface.

Figure 10:
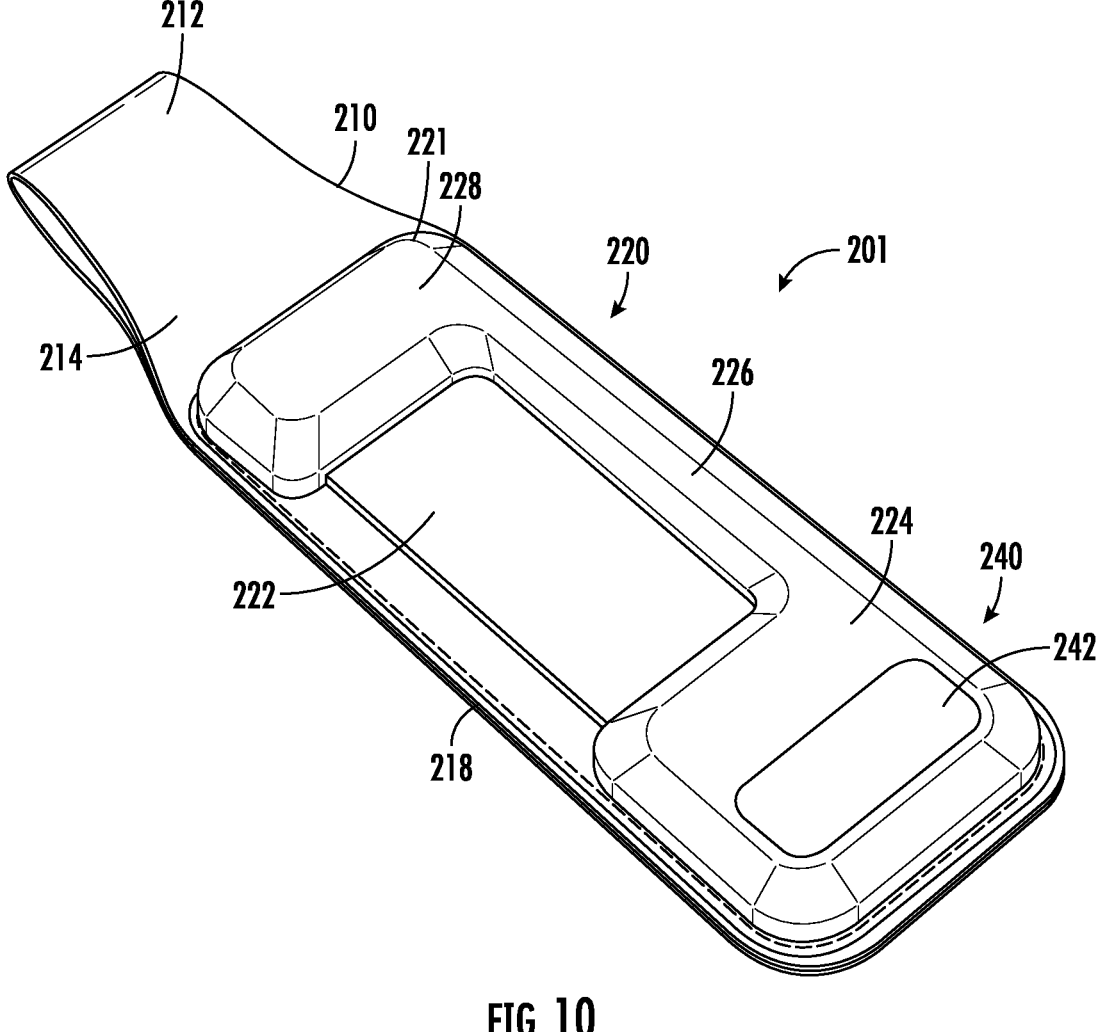
FIG. 10 is a perspective view of one embodiment of the portable electronic weight sensor assembly disposed in the collapsed position.
Figure 11:
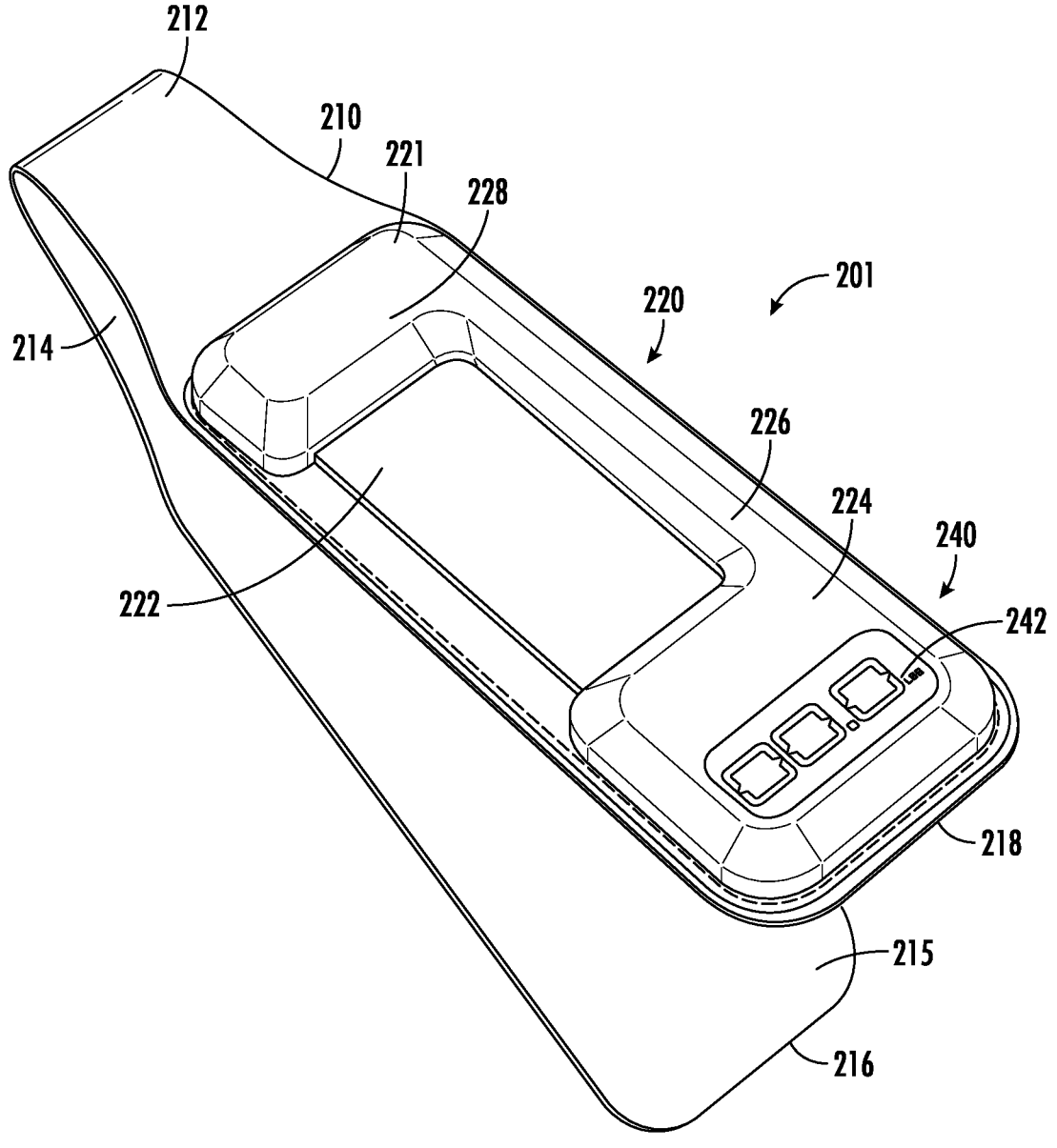
FIG. 11 is a perspective view of one embodiment of the portable electronic weight sensor assembly disposed in a partially collapsed position.
Figure 13:
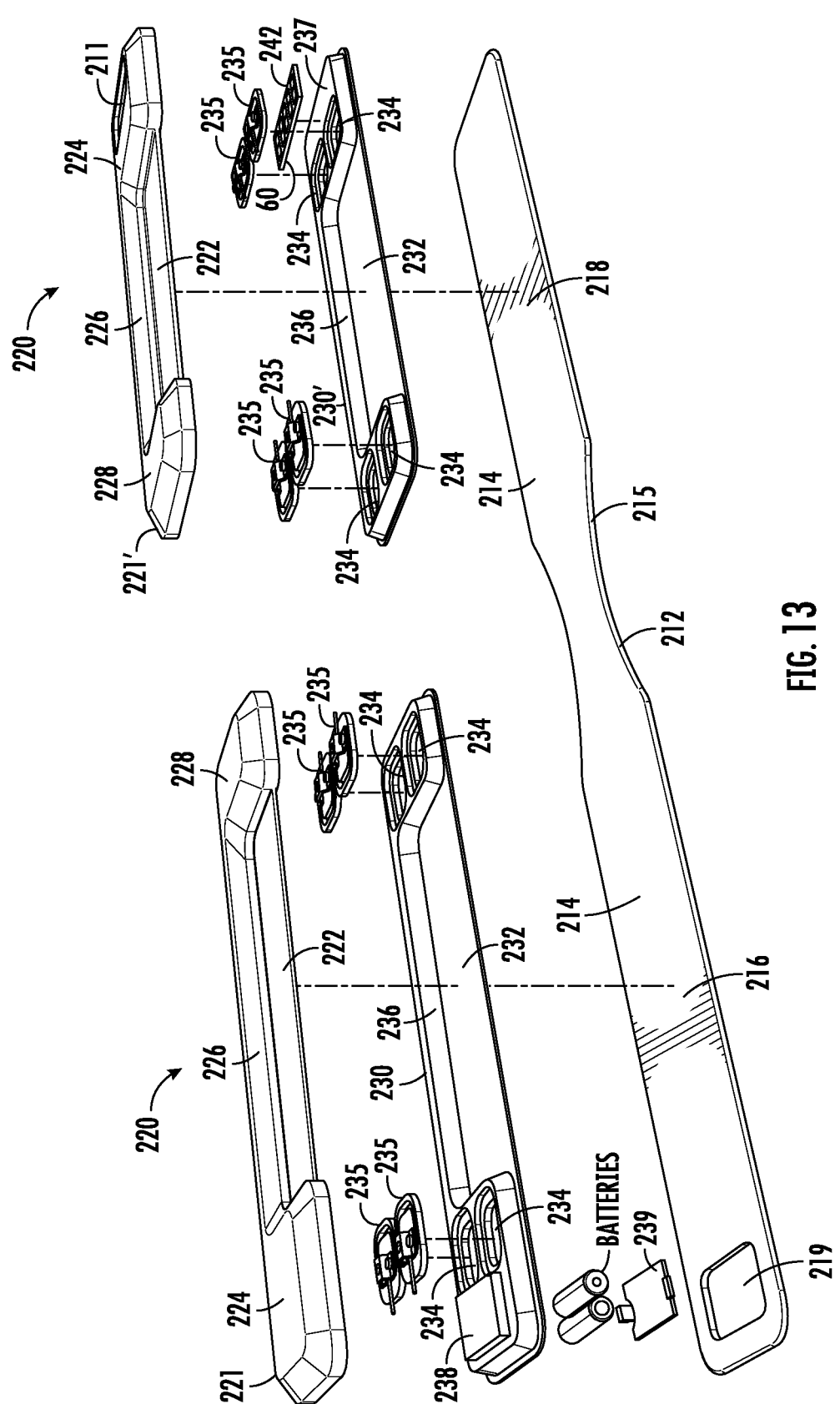
FIG. 13 is an exploded view of one embodiment of the portable electronic weight sensor assembly showing its various components.
Figure 13A:
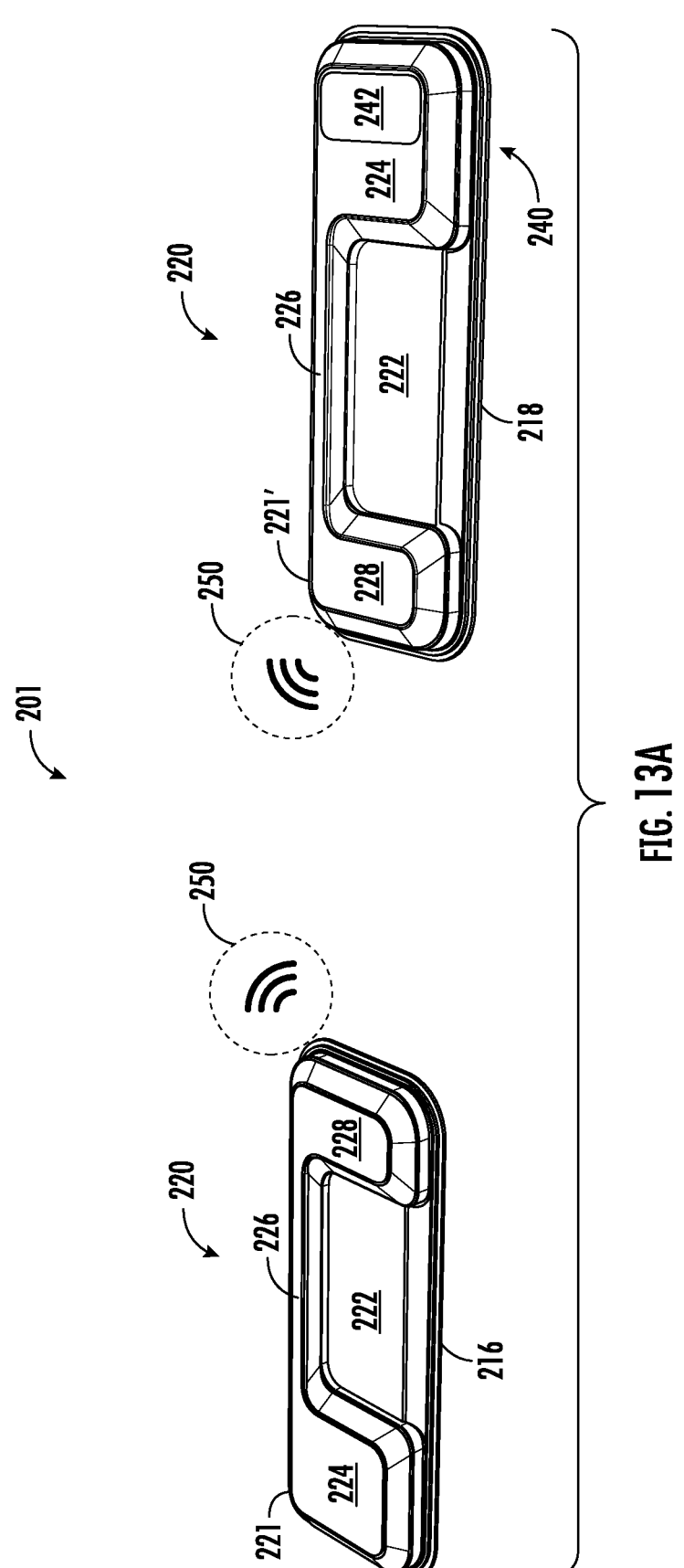
FIG. 13A is a perspective view of one embodiment of the portable electronic weight sensor assembly comprising wireless capabilities.

As is perhaps best shown at FIG. 13, the pad 210 may comprise an elongated shape collectively defined by a left segment 216 and a right segment 218 that are connected to one another by a connecting segment 212. As will be explained hereinafter, it is contemplated that the connecting segment 212 be flexible and allow a movement of the first or left segment 216 relative to the second or right segment 218. For example, the connecting segment should be sufficiently flexible to allow a pivotal movement of the first segment 216 relative to the second segment 218. However, this is not necessarily limiting as it is also possible that the first segment 216 may also achieve a relative moment with respect to the second segment 218 via another mechanism, for example, a hinged connection, etc. Accordingly, it is also contemplated that the present invention may also work without a connecting segment 212, which may be substituted with another connecting mechanism that may, for example, enable a pivotal motion between the first segment 216 and the second segment 218. As such, the pad 210 may be disposed between a variety of positions, including the positions as shown in FIGS. 9-11.

Figure 9:
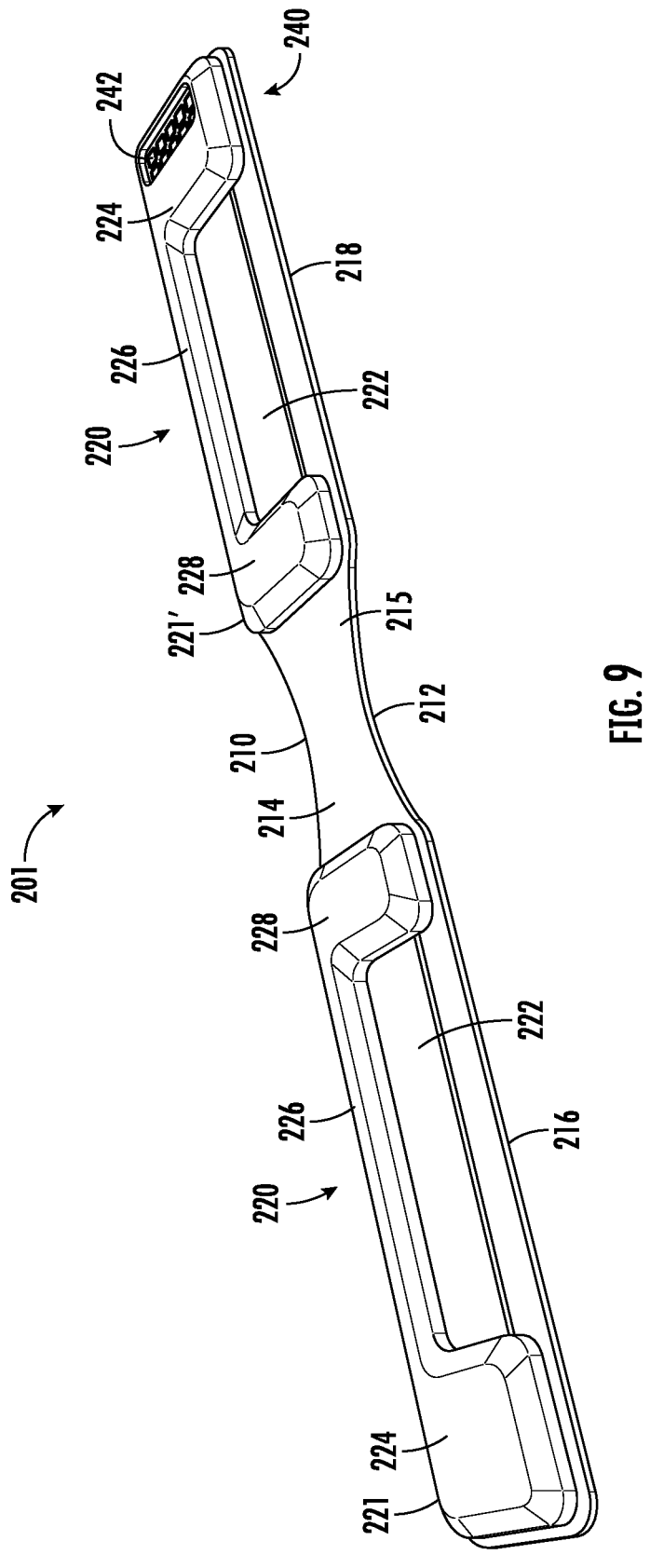
FIG. 9 is a perspective view of one embodiment of the portable electronic weight sensor assembly disposed in the expanded position.
Figure 14:
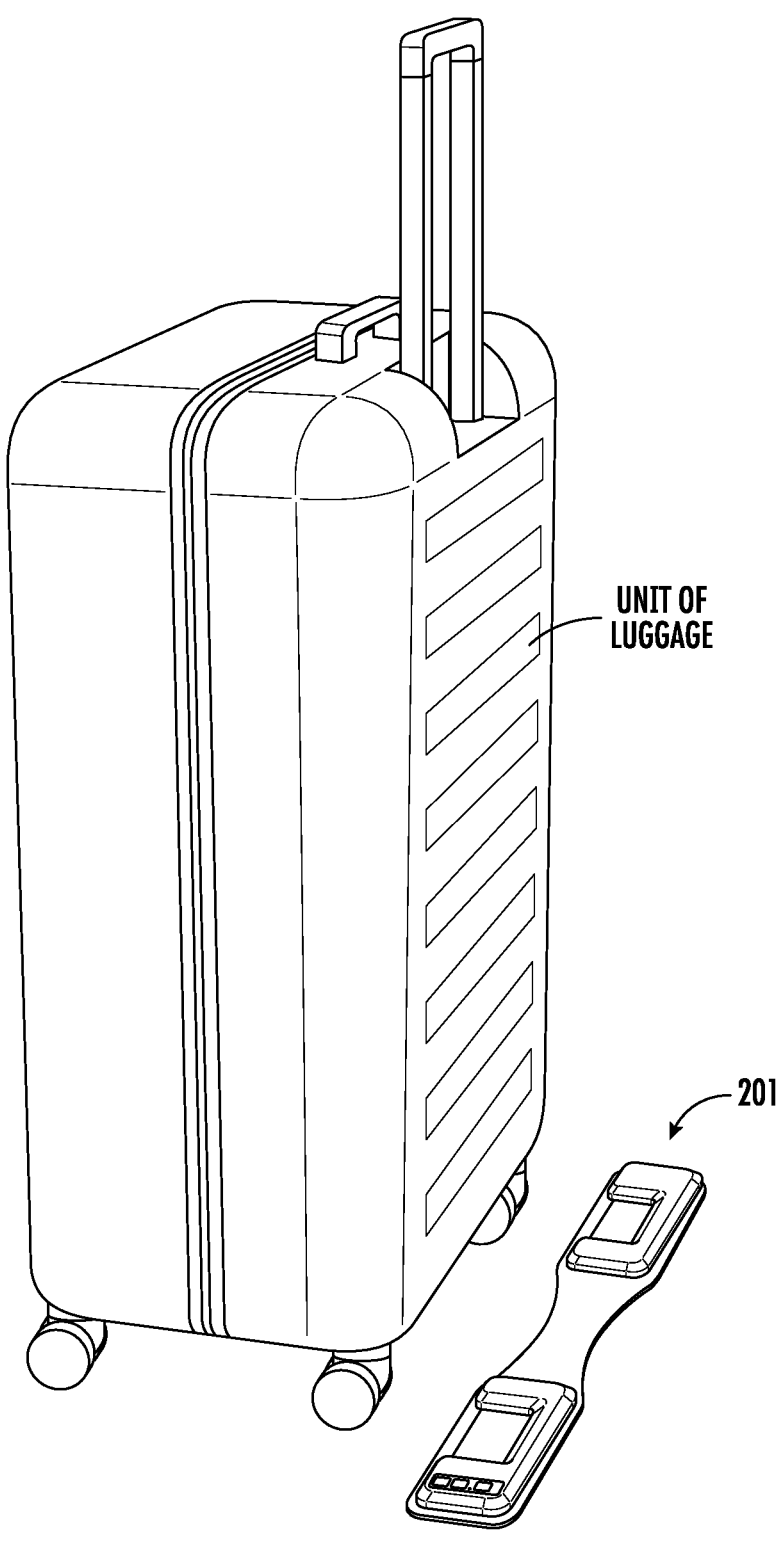
FIG. 14 is a perspective view of one embodiment of the portable electronic weight sensor assembly disposed in the expanded position in front of a unit of luggage.
Figure 15:
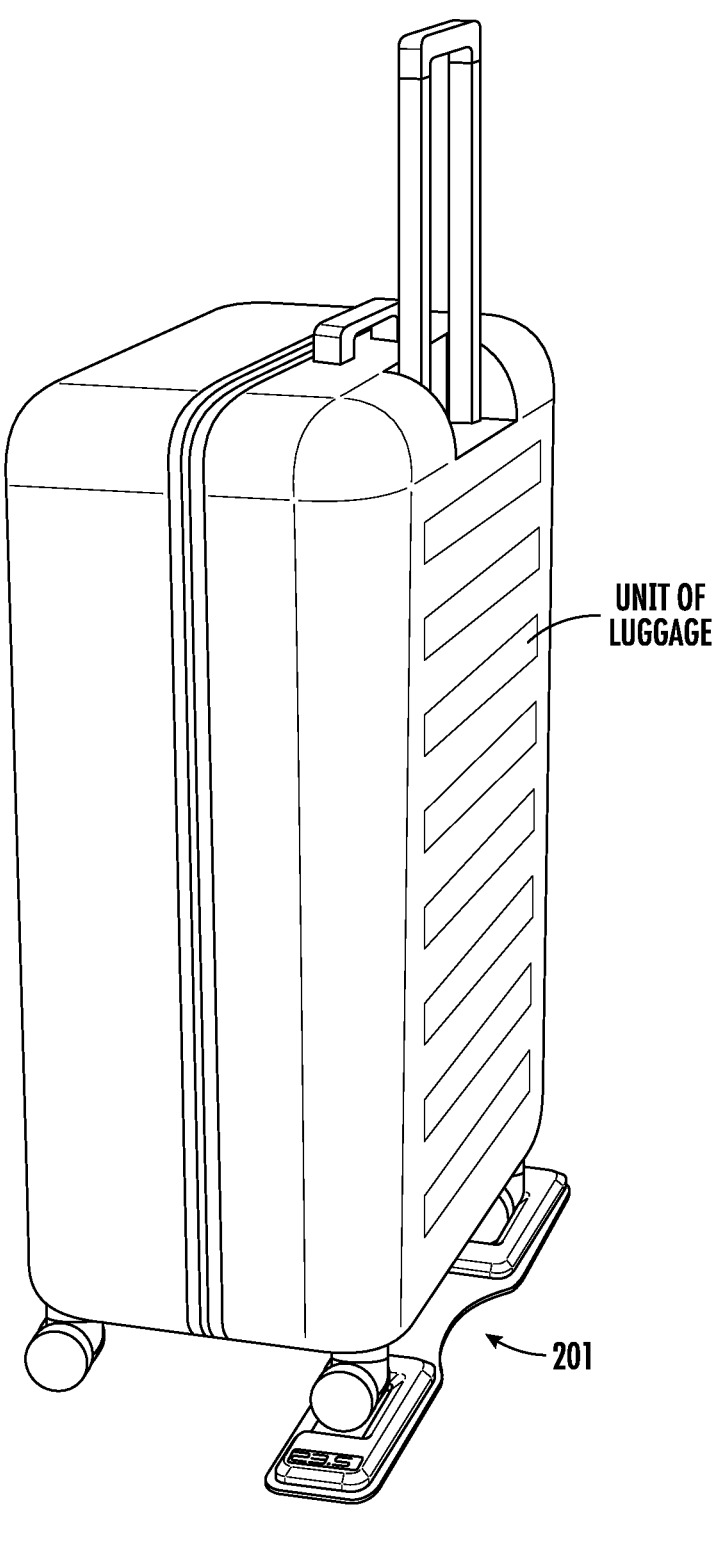
FIG. 15 is a perspective view of one embodiment of the portable electronic weight sensor assembly disposed in the expanded position with a unit of luggage disposed thereon in a substantially vertical position.

As is shown at least in FIGS. 9 and 13, the portable electronic weight sensor assembly 201 according to the present invention may comprise a detection assembly 220. The detection assembly 220 is generally configured to ascertain the total weight of a unit of luggage, but by only capturing the weight as it is transferred to the portable electronic weight sensor assembly 201 through two of the wheels of the unit of luggage. For example, with reference to FIG. 14, the two front wheels of the unit of luggage, or otherwise those wheels that are on the side of the unit of luggage that comprises the handle. As such, a unit of luggage may be grabbed from its handle, e.g., when extended, and its front wheels may be placed on top of the portable electronic weight sensor assembly 201. More specifically, and as will be explained in more detail below, the front wheels of the unit of luggage may be placed on the detection assembly 220, e.g., as represented in FIG. 15. Accordingly, the detection assembly 220 generally comprises various parts and components to accommodate the wheels of a unit of luggage. Further, the dimensions of the components of the detection assembly 220 as well as the pad 210, including the first segment 216 and/or second segment 218, may be configured and dimensioned to accommodate standard and/or custom dimensions as it relates to the diameter and/or thickness of the wheels of the unit of luggage, as well as the separation between them. As it relates to units of luggage comprising four wheels, the two back wheels, i.e., those furthers away from the handle, may also be placed one the detection assembly 220. Further, as it related to units of luggage comprising only two wheels, whether in the front or towards the back of the unit of luggage, those two wheels may also be placed on the detection assembly 220.

As shown at least in FIGS. 9 and 13, the detection assembly 220 generally comprises two assemblies of a housing, i.e., 221 and 221', and a mounting bracket, i.e., 230 and 230'. Each housing 221 and/or 221' may generally comprise a substantially equivalent structure than its counterpart 221' and/or 221. Similarly, each mounting bracket 230 and/or 230' may comprise a substantially equivalent structure than its counterpart 230' and/or 230. Further, as is shown in the illustrative embodiment of FIG. 13, each housing 221 and/or 221' may be configured and dimensioned to at least partially surround its corresponding mounting bracket 230 and/or 230'. At a minimum, each housing 221 and/or 221' should substantially cover or otherwise conceal the top surface and/or sides of its corresponding mounting bracket 230 and/or 230'. However, the bottom surface of the mounting bracket 230 and/or 230' should be disposed on the corresponding segment 216 and/or 218 of the pad 210 around its top surface 214. Moreover, the mounting brackets 230 and/or 230' should be provided with a sufficiently rigid constructions such that the segments 216 and/or 218 are unable to bend fold, or otherwise deform along their length and/or width. Nonetheless, the segments 216 and 218 should remain movable to one another around the connecting segment 212 or other connecting mechanism disposed between them.

Figure 12:
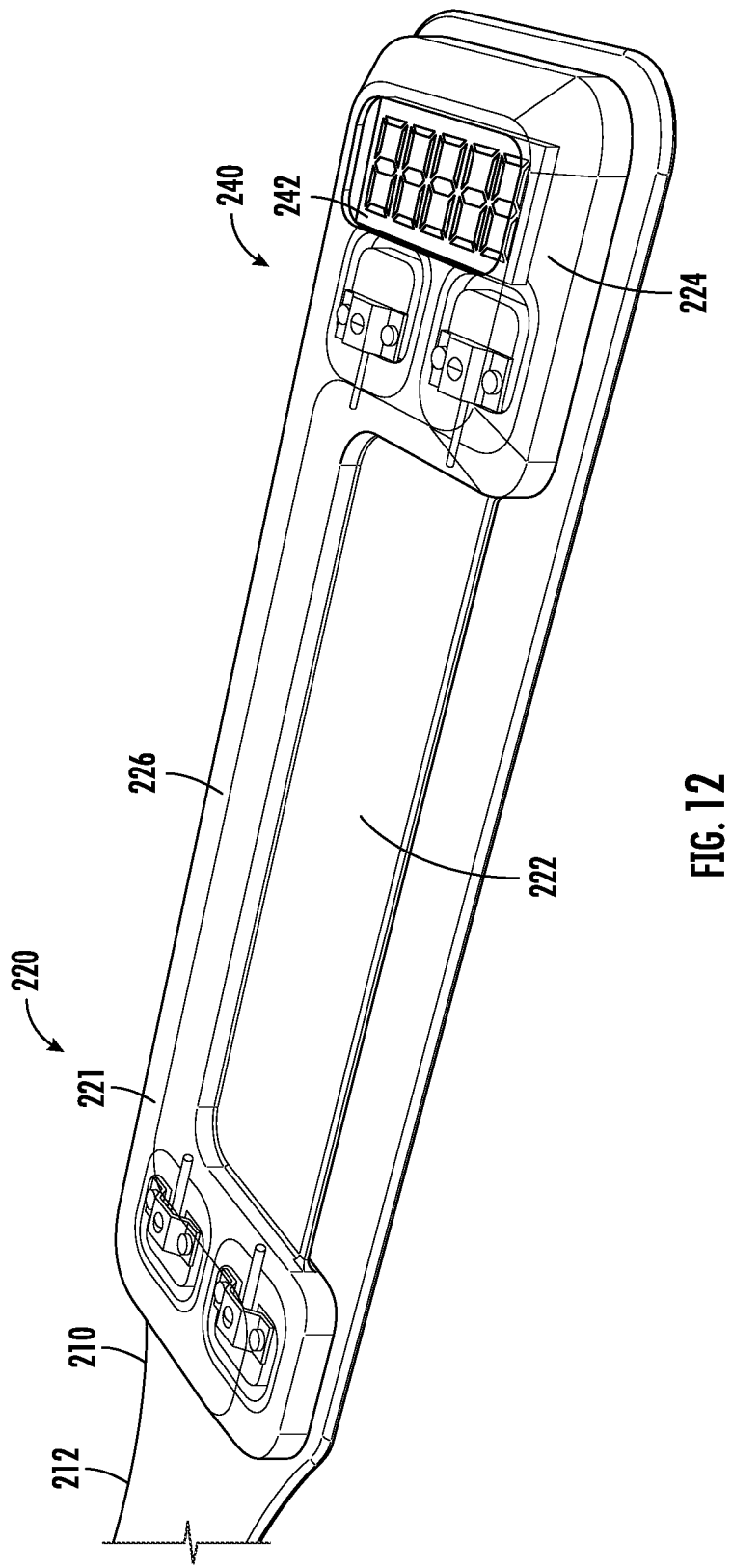
FIG. 12 is a perspective view of a portion one embodiment of the compact electronic weight sensor assembly disposed in the expanded position.

With reference to FIGS. 12-13, the detection assembly 220 further comprises a plurality of weight sensors or simply sensors 235 disposed on the mounting brackets 230 and/or 230'. The sensors 235 may be disposed on corresponding sensor sockets 234 of the mounting brackets 230 and/or 230'. Pairs of sensor sockets 234, and consequently pairs of sensors 235 may be disposed on opposite ends of each mounting brackets 230 and/or 230', for example, as is shown on FIGS. 13 and 12. As such, the sensors 235 are contemplated to be enclosed within housings 221 and/or 221' their corresponding mounting brackets 230 and/or 230'. As shown at least in FIG. 12, the sensors 235 may be disposed in a symmetrical arrangement that facilitates 4 points of contact between the housings 221 and/or 221' and the plurality of sensors 235. In such arrangement, the pairs of sensors 235 are disposed in spaced apart relation to one another in a longitudinal direction and individual pairs of sensors 235 are adjacently disposed to one another in a direction that is substantially perpendicular or transverse to the longitudinal direction, i.e., to the length of the pad. This arrangement of the sensors 235, which is symmetrical about bot directions, i.e., longitudinal and transverse, at least partially ensures an equilibrium of the housings 221 and/or 221' with respect to their corresponding mounting brackets 230 and/or 232'.

As may also be appreciated from FIG. 13, each housing 221 and/or 221' may comprise a first cover 224 disposed in spaced apart relation to a second cover 228. A measuring plate 222 may be disposed between the covers 224 and 228. The measuring plate 222 is intended to be the section of the housings 221 and/or 221' that accommodates each wheel of the unit of luggage. Generally, a measuring section 232 of the mounting brackets 230 and/or 230' is provided below the measuring plate 222. The measuring section 232 should be dimensioned to substantially correspond to the geometry of the measuring plate 222. Additionally, a stopper 226 may be provided to limit the wheels from losing their position once they are disposed on the detection assembly 220. The stopper 226 essentially acts as a barrier that would limit the wheels' movement. Accordingly the stopper 226 may be connected to each of the covers 224 and 225 and may be adjacently disposed to the measuring plate. As such, the first cover 224, the second cover 225, the measuring plate 22 and optionally the stopper 226 may collectively define the housings 221 and/or 221'. Further, an underside of the housings 221 and/or 221' may be configured and dimensioned to accommodate components that may be disposed beneath, for example, sensors 235 and their corresponding sockets 234.

In addition, and as show in FIG. 13, a battery socket 238 with a cap 239 may also be provided such that batteries may be inserted therein through an opening 219 of the pad 210. The battery socket 238 may be configured and dimensioned to fit on the underside of one of the covers 224 and/or 228. It is contemplated that the batteries may be operatively configured with other components to provide an electrical charge to them, e.g., the sensors 235, the processor 60, the display 242, etc., Moreover, the stopper 226 may comprise a substantially hollow configuration such that it may at least partially surround a sidewall 236 of the mounting brackets 221 and/or 221'. If a sidewall 236 is provided, it should be configured and dimensioned such that it may be inserted onto the underside of the stopper 226. Similarly, a display 242 and/or processor 60 may be disposed on a display socket 237 of the mounting bracket 221 and/or 221. The display 242 and display socket 237 may be configured and dimensioned such that both may be operatively disposed on an underside of one of the covers 224 and/or 228. Further, as is shown in the illustrative embodiment of FIG. 13 the covers 224 and/or 228 may be provided with an opening, e.g., at the top, such that the display 242 is viewable, but is at least partially covered by its respective cover 224 and/or 228.

As mentioned above, it is within the scope of the present invention that the detection assembly 220 be able to ascertain the weight of the unit of luggage as it is transferred from the wheels to the housings 221 and/or 221'. Accordingly, it is contemplated that the housings 221 and/or 221' be configured and dimensioned such that they may move in a vertical direction with respect to their corresponding mounting brackets 230 and/or 230' and create a pressure on the sensors 235. That is, the housings 221 and/or 221' as well as the mounting brackets 230 and/or 230' should be configured and dimensioned to allow a corresponding deflection and/or movement of the various components of the housings 221 and/or 221', e.g., covers 224, 226 and/or measuring plate 222, as the weight of the unit of luggage that is transferred, i.e., through a corresponding wheel, creates a pressure or otherwise force on the housings 221 and/or 221'. As such, as the wheels of the unit of luggage create a pressure on the housings 221 and/or 221', which is in turn, transferred to the sensors 235.

As such, even though not strictly required, the detection assembly 220 may comprise a plurality of load cell sensors 235 that are able to ascertain the stress created by weight of the wheels of the unit of luggage on the housings 221 and/or 221'. Such as stress or force may initially be transferred to the measuring plate 222, which may in turn transfer it to the first cover 224 and/or second cover 228. Further, pairs or individual ones of the pluralities of sensors 235 may be disposed on an underside of the covers 224 and/or 228. Moreover, the sensors 235, including load cell sensors, may be connected to the underside of the covers 224 and/or 228, such that they can ascertain a movement of their corresponding covers 224 and/or 228, and/or an induced stress that is transferred to the sensors 235 through the covers 224 and/or 228.

Additional features of the present invention comprise providing a portable electronic weight sensor assembly 201 that may be disposed into and out of a collapsed position and an expanded position. It is contemplated that the portable electronic weight sensor assembly 201 may be disposable into an expanded position, e.g., FIGS. 9 and 14-17, which is intended to ascertain the weight of the unit of luggage. In the expanded position, segments 216 and 218 are oppositely disposed to one another and are coplanar to one another. If a connecting segment 212 is also provided, in the operative position, the connecting segment 212 may also be disposed in a coplanar alignment to the segments 216 and 218. In the operative position, the bottom surface 215 of the pad 210 should be facing the floor or ground surface, i.e., adjacent to the unit of luggage, such that the connecting assembly is accessible to the wheels of the unit of luggage.

With reference to at least FIG. 11, the portable electronic weight sensor assembly 201 may also be disposed in a collapsed position. The collapsed position is intended for periods of non-operation of the portable electronic weight sensor assembly 201, including storage thereof. In the collapsed position, the segments 216 and 218 of the pad 210 are disposed in confronting relation to one another in a way that reduces the space that the portable electronic weight sensor assembly 201 occupies. In the collapsed position the segments 216 and 218 are disposed in confronting relation to one another around the bottom surface 215 of the pad 210. Optionally, when the portable electronic weight sensor assembly 201 is disposed in the collapsed position, the display 242 may be configured to be automatically turned off. Conversely, when the portable electronic weight sensor assembly 201 is disposed in any other position, including the operative position and/or a partially collapsed or partially collapsed position, e.g., as shown in FIG. 11, the display 242 may be configured to automatically activate and/or turn on.

Figure 18:
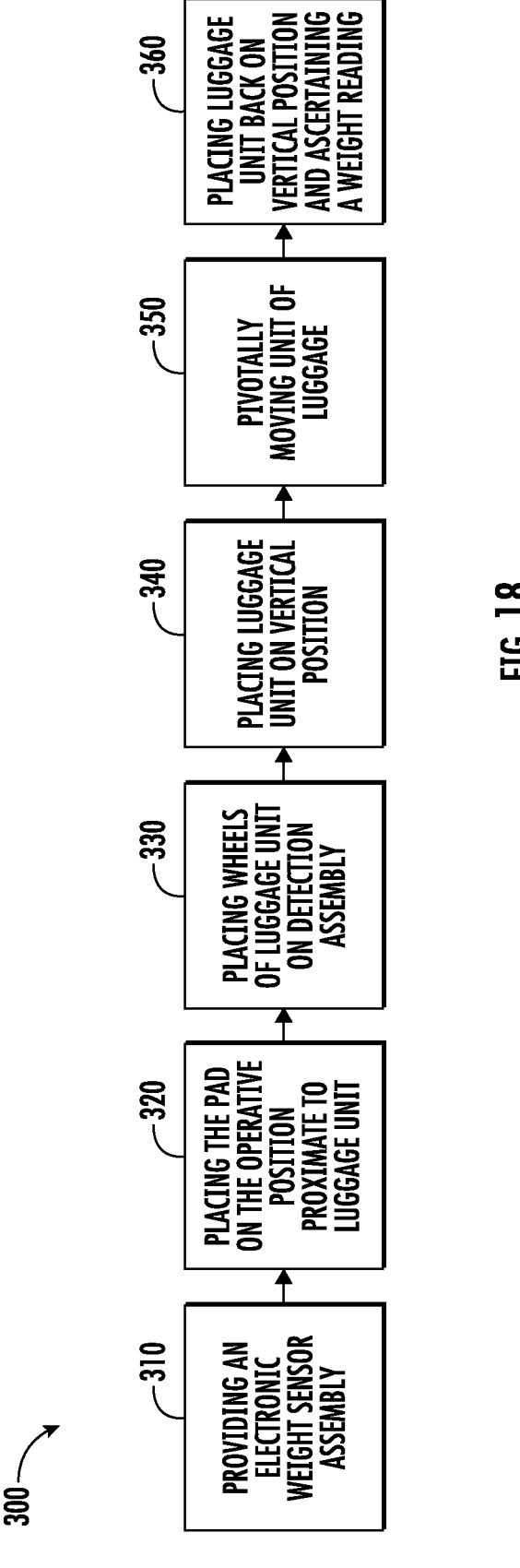
FIG. 18 is a diagrammatic representation of the method according to the present invention of using the compact electronic weight sensor assembly to ascertain the weight of a unit of luggage.

With reference now to FIG. 18, and as mentioned above, the present invention comprises providing a method 300 of using the inventive portable electronic weight sensor assembly 201 to ascertain the weight of a unit of luggage comprising either four wheels or two wheels. As shown at 310, the method 300 comprises providing a portable electronic weight sensor assembly 201 as defined herein. Thereafter, as shown at 320 the method 300 comprises placing the pad 210 in the operative position as defined herein proximate to the unit of luggage, e.g., as shown in FIG. 14. As shown at 330, the method 300 further comprises placing two wheels of the unit of luggage on the measuring plates 222 of the detection assembly 220. Thereafter, as shown at 340, the method 300 comprises placing the unit of luggage in a substantially vertical position, e.g., as shown in FIG. 15.

Figure 16:
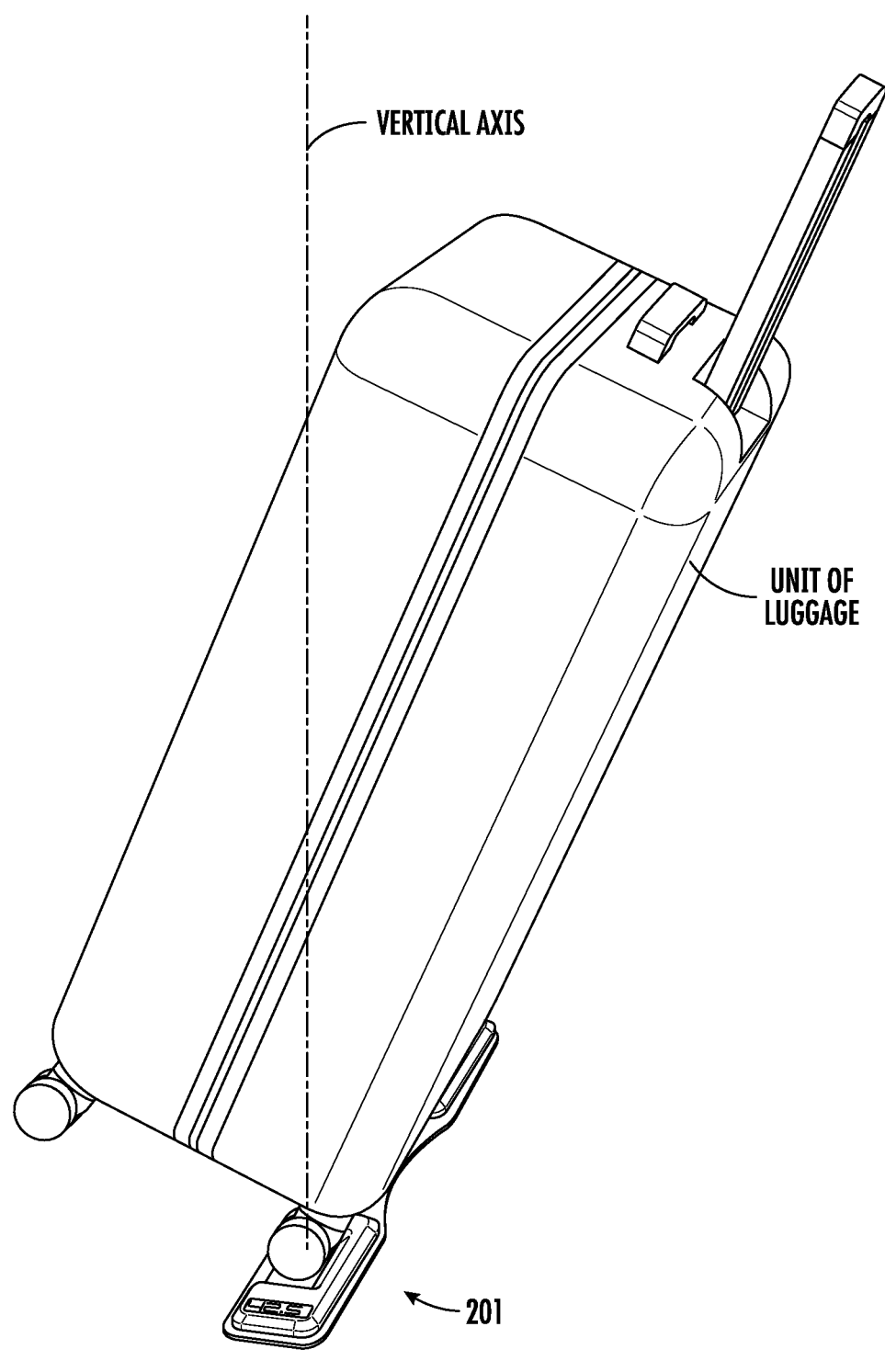
FIG. 16 is a perspective view of one embodiment of the portable electronic weight sensor assembly disposed in the expanded position with a unit of luggage disposed thereon in a substantially inclined position.

As shown at 350, the method 300 further comprises pivotally moving the unit of luggage in a forward direction until at least a majority of the weight of the unit of luggage is in front of the vertical axis around the wheels of the unit of luggage disposed on the detection assembly 220, e.g., as is shown in FIG. 16. The present invention contemplates manually moving the unit of luggage, for example, by its handle, form the position shown in FIG. 15, to at least a position similar to that as shown on FIG. 16. In the illustrative embodiment as shown in FIG. 16, in order for the detection assembly 220 to ascertain an accurate weight reading, the unit of luggage should be tilted or otherwise pivotally moved such that at least a majority of its weight is located in front of a vertical axis roughly defined by at the middle of the front wheels of the unit of luggage. As the unit of luggage is being titled forward, detection assembly 220 may ascertain various weight readings, which in theory should increase as the center of the weight of the unit of luggage approaches the vertical axis defined at the front wheels. Once approximately half of the weight of the unit of luggage is on either side of the vertical axis, the unit of luggage should reach an "apex" or approximately a highest weight reading. At this apex, the weight reading of the detection assembly 220 should be approximately the same as the weight of the unit of luggage.

However, in order to ensure an accurate reading, the inventive method contemplates further tilting the until of luggage until at least a majority of its weight is beyond the vertical axis. At this juncture, the weight reading captured by the electronic weight sensor assembly 201 should start to decrease as the unit of luggage is further tilted away from the vertical axis defined at the wheels of the unit of luggage. Accordingly, the operative components of the detection assembly 220, i.e., the sensors 235, housings 221 and/or 221', mounting brackets 230 and/or 230' and/or processor 60, should be collectively configured and dimensioned to ascertain a highest weight reading of the unit of luggage as the unit of luggage is tilted from the vertical position to a position in which at least a majority of its weight is on the opposite side of the vertical axis, e.g., FIG. 16.

Figure 17:
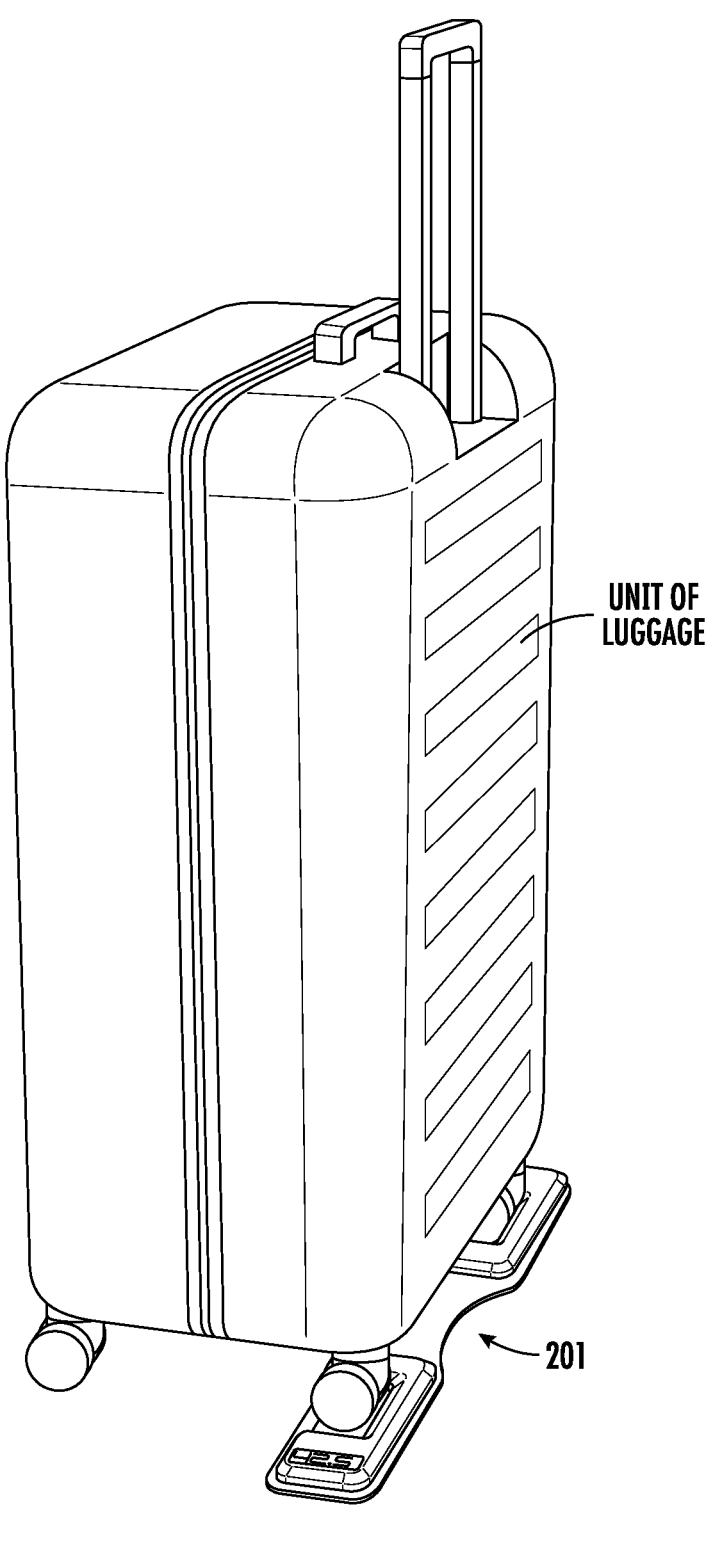
FIG. 17 is a perspective view of one embodiment of the portable electronic weight sensor assembly disposed in the expanded position with a unit of luggage disposed thereon and back in a substantially vertical position.

Thereafter, as shown at 360, the method comprising placing the unit of luggage back to its vertical position, e.g., as shown in FIG. 17, and observing a weight reading of the portable electronic weight sensor assembly 201 on the display 242. At this stage, the wheels of the unit of luggage may be removed from the detection assembly 220, e.g., as shown in FIG. 14. If this occurs, the user may select to re-start the process by placing the unit of luggage back on the detection assembly 220, which will re-set a prior weight reading. Nonetheless, a user may remove the unit of luggage from the detection assembly 220 and may elect to simply place it again on the detection assembly 220 to perform another tilting motion. In turn, this will serve corroborate or otherwise check that the weight of the unit of luggage is accurate by overriding any prior readings that may be below a new highest recorded weight reading. As such, the operative components of the detection assembly 220 may be collectively configured to ascertain a highest weight reading after various tilting motions or cycles until the user selectively re-sets a prior weight reading.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A portable electronic weight sensor assembly for ascertaining the weight of a unit of luggage, the electronic weight sensor assembly comprising:

a pad comprising a top surface and a bottom surface, the pad comprising a first segment and a second segment movable with respect to one another, a detection assembly comprising a plurality of sensors, a first housing and a second housing; the first housing and the second housing cooperatively configured and dimensioned to at least partially cover and attach respectively to a first mounting bracket and a second mounting bracket, the first housing and the second housing movable respectively to the first mounting bracket and the second mounting bracket, a first group of the plurality of sensors disposed between the first housing and the first mounting bracket, a second group of the plurality of sensors operatively disposed between the second housing and the second mounting bracket, a processing unit disposed between either the first housing and the first mounting bracket or the second housing and the second mounting bracket, and the processing unit operatively configured with each one of the first group of the plurality of sensors and each one of the second group of the plurality of sensors to ascertain the weight of the unit of luggage;

wherein the detection assembly is disposed on the top surface of the pad.

2. The portable electronic weight sensor assembly as recited in claim 1 wherein the first segment and the second segment connected to a foldable middle segment.

3. The portable electronic weight sensor assembly as recited in claim 1 further comprising a display operatively connected to the processing unit and at least partially disposed between either the first housing and the first mounting bracket or the second housing and the second mounting bracket, the display and the processing unit cooperatively configured to display the weight of the unit of luggage.

4. The portable electronic weight sensor assembly as recited in claim 1 wherein the first segment is pivotably movable with respect to the second segment.

5. The portable electronic weight sensor assembly as recited in claim 1 wherein the first mounting bracket is disposed on the first segment of the pad and the second mounting bracket is disposed on the second segment of the pad.

6. The portable electronic weight sensor assembly as recited in claim 1 wherein the detection assembly comprises a plurality of batteries operatively configured with the processing unit and the first and second group of the plurality of sensors to provide an electrical charge.

7. The portable electronic weight sensor assembly as recited in claim 1 wherein the each of the first housing and the second housing comprise a first cover disposed in spaced apart relation to a second cover, and a measuring plate connected to the first cover and the second cover respectively around a lower portion of the first cover and a second portion of the second cover.

8. The portable electronic weight sensor assembly as recited in claim 7 wherein the measuring plate is configured and dimensioned to correspond to the size of a wheel of the unit of luggage.

9. The portable electronic weight sensor assembly as recited in claim 7 wherein each of the first housing and the second housing comprise a sidewall disposed on a side thereof; the sidewall configured to at least partially reduce the wheel of the unit of luggage from rolling off from the measuring plate.

10. The portable electronic weight sensor assembly as recited in claim 1 wherein the first housing and the second housing are movable in a vertical direction respectively to the first mounting bracket and the second mounting bracket.

11. The portable electronic weight sensor assembly as recited in claim 1 wherein the plurality of sensors comprises load cell sensors.

12. The portable electronic weight sensor assembly as recited in claim 1 wherein the pad is disposable into and out of an operative position and a collapsed position; the operative position comprising the pad extended on a ground surface with the first segment, the second segment and the foldable middle segment being coplanar to one another, the collapsed position comprising the first segment disposed in confronting relation to the second segment.

13. The portable electronic weight sensor assembly as recited in claim 12 wherein in the collapsed position, the first segment is disposed in confronting relation to the second segment.

14. A portable electronic weight sensor assembly for ascertaining the weight of a unit of luggage, the electronic weight sensor assembly comprising:
  a pad comprising a top surface and a bottom surface, the pad comprising a first segment and a second segment pivotally movable with respect to one another, the first segment and the second segment connected to a foldable middle segment,
  a detection assembly comprising a plurality of load cell sensors, a first housing and a second housing; the first housing and the second housing cooperatively configured and dimensioned to cover and attach respectively to a first mounting bracket and a second mounting bracket, the first housing and the second housing movable in a vertical direction respectively to the first mounting bracket and the second mounting bracket,
  the first mounting bracket disposed on the first segment of the pad and the second mounting bracket disposed on the second segment of the pad,
  a first group of the plurality of load cell sensors disposed between the first housing and the first mounting bracket, a second group of the plurality of load cell sensors operatively disposed between the second housing and the second mounting bracket,
  a processing unit disposed between either the first housing and the first mounting bracket or the second housing and the second mounting bracket,
  the processing unit operatively configured with each one of the plurality of load cell sensors to collectively ascertain the weight of the unit of luggage,
  a display operatively connected to the processing unit and at least partially disposed between either the first housing and the first mounting bracket or the second housing and the second mounting bracket, the display and the processor cooperatively configured to display the weight of the unit of luggage.

15. The portable electronic weight sensor assembly as recited in claim 14 wherein a movement of the first housing in a downward direction is structured to induce: a corresponding stress on at least some of the first group of the plurality of load cell sensors that is indicative of a portion of the weight of the unit of luggage, and a corresponding stress on at least some of the second group of the plurality of load cell sensors that is indicative of a portion of the weight of the unit of luggage.

16. The portable electronic weight sensor assembly as recited in claim 14 wherein a movement of the second housing in the downward direction is structured to induce: a corresponding stress on at least some of the second group of the plurality of load cell sensors that is indicative of a portion of the weight of the unit of luggage, and a corresponding stress on at least some of the first group of the plurality of load cell sensors that is indicative of a portion of the weight of the unit of luggage.

17. The portable electronic weight sensor assembly as recited in claim 14 wherein the first group of the plurality of load cell sensors comprises four load cell sensors connected to the first housing; the second group of the plurality of load cell sensors comprises four load cell sensors connected to the second housing.

18. The portable electronic weight sensor assembly as recited in claim 14 wherein each one of the four load cell sensors of the first group are connected to an underside of the first housing; each one of the four load cell sensors of the second group are connected to an under side of the second housing in spaced apart relation to one another.

19. A method of using a portable electronic weight sensor assembly to ascertain the weight of a unit of luggage, the method comprising:
  providing a portable electronic weight sensor assembly comprising:
  a pad comprising a top surface and a bottom surface, the pad comprising a first segment and a second segment movable with respect to one another,
  a detection assembly comprising a plurality of sensors, a first housing and a second housing; the first housing and the second housing cooperatively configured and dimensioned to at least partially cover and attach respectively to a first mounting bracket and a second mounting bracket, the first housing and the second housing movable respectively to the first mounting bracket and the second mounting bracket, a first group of the plurality of sensors disposed between the first housing and the first mounting bracket, a second group of the plurality of sensors operatively disposed between the second housing and the second mounting bracket, each of the first housing and the second housing comprise a first cover disposed in spaced apart relation to a second cover, and a measuring plate connected to the first cover and the second cover respectively around a lower portion of the first cover and a second portion of the second cover, a processing unit disposed between either the first housing and the first mounting bracket or the second housing and the second mounting bracket, the processing unit operatively configured with each one of the first group of the plurality of sensors and each one of the second group of the plurality of sensors to ascertain the weight of the unit of luggage, and the pad disposable into and out of an operative position and a collapsed position; the operative position comprising the pad extended on a ground surface with the first segment, the second segment and the foldable middle segment being coplanar to one another, the collapsed position comprising the first segment disposed in confronting relation to the second segment, placing the pad on the operative position, placing two wheels of the unit of luggage, each one respectively on corresponding measuring plates of the first housing and the second housing, placing the unit of luggage in a substantially vertical position, pivotally moving the unit of luggage in a forward direction until at least a majority of the weight of the unit of luggage is in front of a vertical axis defined at the center of the two wheels of the unit of luggage, placing the unit of luggage back in the substantially vertical position, and ascertaining a weight reading of the unit of luggage on the display.

* * * * *